(12) United States Patent
Matsumoto et al.

(10) Patent No.: US 9,524,538 B2
(45) Date of Patent: Dec. 20, 2016

(54) IMAGE PROCESSING APPARATUS

(71) Applicant: FUJITSU TEN LIMITED, Kobe-shi, Hyogo (JP)

(72) Inventors: Takeo Matsumoto, Kobe (JP); Teruhiko Kamibayashi, Kobe (JP); Kohji Ohnishi, Kobe (JP); Tomoyuki Fujimoto, Kobe (JP); Daisuke Yamamoto, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 0 days.

(21) Appl. No.: 14/850,174

(22) Filed: Sep. 10, 2015

(65) Prior Publication Data

US 2016/0086308 A1 Mar. 24, 2016

(30) Foreign Application Priority Data

Sep. 19, 2014 (JP) .................................. 2014-191225
Sep. 19, 2014 (JP) .................................. 2014-191226

(51) Int. Cl.
*G06K 9/32* (2006.01)
*G06T 3/40* (2006.01)
*H04N 7/18* (2006.01)

(52) U.S. Cl.
CPC ............. *G06T 3/4007* (2013.01); *G06T 3/403* (2013.01); *H04N 7/183* (2013.01)

(58) Field of Classification Search
CPC ........ G06T 3/4007; G06T 3/403; G06T 5/001; H04N 7/183; H04N 7/012; H04N 9/045
See application file for complete search history.

(56) References Cited

U.S. PATENT DOCUMENTS

| | | | | |
|---|---|---|---|---|
| 5,019,903 | A * | 5/1991 | Dougall | G06T 3/4007 348/448 |
| 6,205,259 | B1 * | 3/2001 | Komiya | G06T 5/50 348/E3.032 |
| 6,456,324 | B1 * | 9/2002 | Yamada | H04N 3/1587 348/219.1 |
| 6,477,282 | B1 * | 11/2002 | Ohtsuki | G06T 3/4007 382/266 |
| 6,724,932 | B1 * | 4/2004 | Ito | G06T 3/4015 348/275 |

(Continued)

FOREIGN PATENT DOCUMENTS

| | | |
|---|---|---|
| JP | 2009-157449 A | 7/2009 |
| JP | 2013-126134 A | 6/2013 |
| JP | 2013-240014 A | 11/2013 |

*Primary Examiner* — Amir Alavi
(74) *Attorney, Agent, or Firm* — Oliff PLC

(57) ABSTRACT

A first interpolation processor of an image processing apparatus performs a first interpolation process, using values of a plurality of input pixels of an input image aligned in an arranged direction that is one of a horizontal direction and a vertical direction. Thus, the first interpolation processor derives a value of each of a plurality of noted points on an inclined interpolation line inclined relative to the horizontal direction and extending through a location of a processed pixel of an output image. Moreover, second interpolation processor derives a value of the processed pixel by performing a second interpolation process, using the derived values of the plurality of noted points on the inclined interpolation line.

22 Claims, 29 Drawing Sheets

(56) References Cited

U.S. PATENT DOCUMENTS

| | | | | |
|---|---|---|---|---|
| 7,483,040 B2* | 1/2009 | Michel | .................... | G06T 3/403 |
| | | | | 345/582 |
| 8,121,398 B2* | 2/2012 | Yoshitake | .......... | G01N 21/9501 |
| | | | | 348/308 |
| 2008/0111916 A1* | 5/2008 | Wang | .................... | H04N 7/012 |
| | | | | 348/448 |
| 2016/0086308 A1* | 3/2016 | Matsumoto | ........... | G06T 3/4007 |
| | | | | 382/300 |
| 2016/0203601 A1* | 7/2016 | Choi | ................... | A61B 6/5205 |
| | | | | 382/131 |

* cited by examiner

IMAGE PROCESSING APPARATUS

BACKGROUND OF THE INVENTION

Field of the Invention

The invention relates to a technology for changing an image size.

Description of the Background Art

When a size of an image is changed (enlarged or reduced), an interpolation process, using interpolation, has been conventionally performed to derive values of pixels of an image after a change, based on pixels of the image before the change. For example, bilinear interpolation and bicubic interpolation are among methods of the interpolation process conventionally used.

In a case where a size of an image is changed by the conventional interpolation method mentioned above, a phenomenon called jaggy occurs. In the phenomenon, edges of images are stepped in the image after the change. Jaggies generally occur in portions inclined relative to a horizontal direction.

The jaggies cause damage to outlines of images in the image and diminishes beauty of the image. Therefore, a desired technology is to reduce the jaggies caused by a change of an image size.

SUMMARY OF THE INVENTION

According to one aspect of the invention, an image processing apparatus generates an output image from an input image by changing a size of the input image. The image processing apparatus includes: a first interpolation processor that derives values of a plurality of noted points on an inclined interpolation line by performing a first interpolation process, the first interpolation process using values of a plurality of input pixels of the input image aligned in an arranged direction that is one of a horizontal direction and a vertical direction to derive the value for each of the noted points, the inclined interpolation line extending through a location of a processed pixel of the output image and being inclined relative to the horizontal direction; and a second interpolation processor that derives a value of the processed pixel by performing a second interpolation process, using the derived values of the plurality of noted points on the inclined interpolation line.

Since the value of the processed pixel of the output image is derived in the second interpolation process using the values of the plurality of noted points on the inclined interpolation line, jaggies can be reduced in the output image.

According to another aspect of the invention, the image processing apparatus further includes: an edge processor that derives information of a processed edge of the processed pixel of the output image. The first interpolation processor performs the first interpolation process, according to an angle of the processed edge relative to the horizontal direction.

Since the first interpolation process is performed according to the angle of the processed edge, jaggies can be reduced in the output image.

According to another aspect of the invention, the image processing apparatus further includes: an edge processor that derives information of a processed edge of the processed pixel of the output image; and an angle setter that sets an angle of the inclined interpolation line relative to the horizontal direction, according to an angle of the processed edge relative to the horizontal edge.

Since the values of the plurality of noted points on the inclined interpolation line according to the angle of the processed edge are used in the second interpolation process, jaggies can be reduced in the output image.

Therefore, an object of the invention is to reduce jaggies in the output image.

These and other objects, features, aspects and advantages of the invention will become more apparent from the following detailed description of the invention when taken in conjunction with the accompanying drawings.

BRIEF DESCRIPTION OF THE DRAWINGS

FIG. 25 illustrates vicinity pixels in a vicinity of a processed pixel;

FIG. 26 illustrates categorization of vicinity pixels;

DESCRIPTION OF THE EMBODIMENTS

An embodiment of the invention is hereinafter described with reference to the drawings.

<1. Outline of Image Processing Apparatus>

Figure 1:
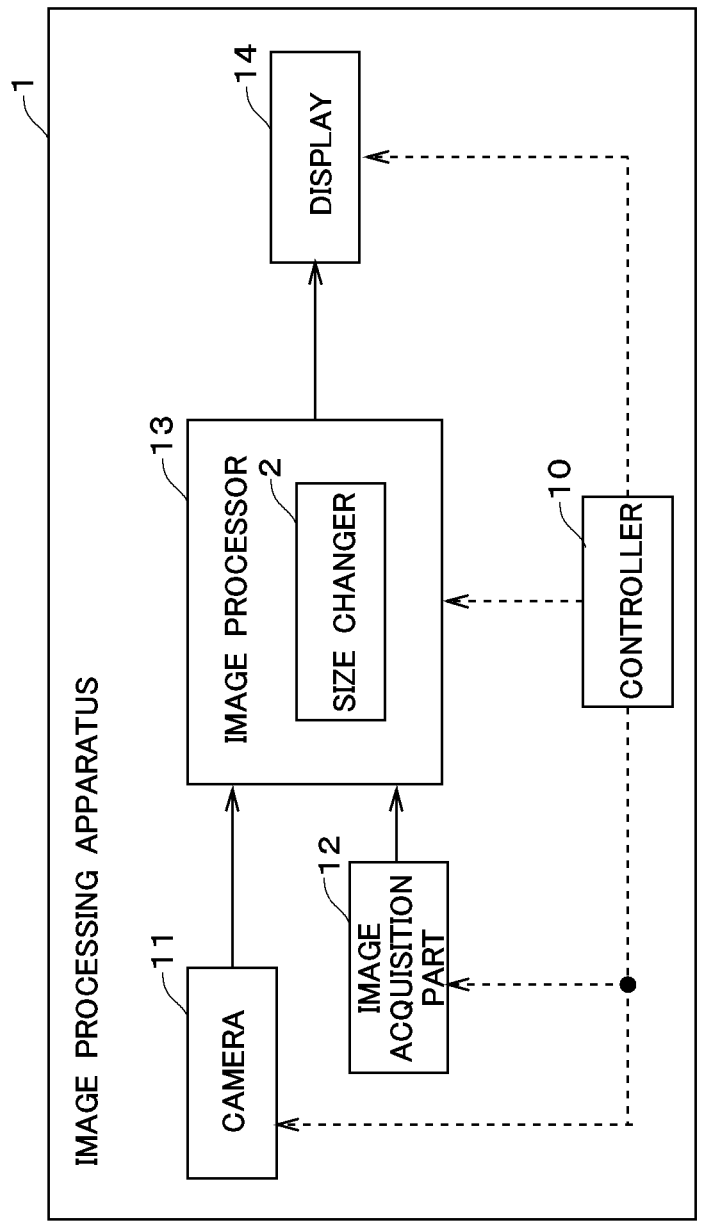
FIG. 1 illustrates a schematic configuration of an image processing apparatus.

FIG. 1 illustrates a schematic configuration of an image processing apparatus 1 of this embodiment. The image processing apparatus 1 is, for example a vehicle-mounted apparatus that is installed on a vehicle and includes a function of displaying various images.

The image processing apparatus 1 includes a camera 11, an image acquisition part 12 and a display 14. The camera 11 is mounted on the vehicle, facing outside the vehicle, and captures images of a vicinity of the vehicle. Moreover, the image acquisition part 12 acquires images from a recording media, such as a DVD, or from a broadcast media, such as digital television broadcasting. The display 14 is provided in a cabin of the vehicle and displays the various images. Therefore, the images captured by the camera 11 and the images acquired by the image acquisition part 12 are displayed on the display 14 of the image processing apparatus 1.

Moreover, the image processing apparatus 1 further includes a controller 10 and an image processor 13.

The controller 10 comprehensively controls the entire image processing apparatus 1. The controller 10 includes a computer including a CPU, a RAM and a ROM, etc. Various functions of the controller 10 are implemented by the CPU performing arithmetic processes in accordance with a program stored in the ROM, etc. Such a program is provided via a non-transitory computer-readable recording medium or a network.

The image processor 13 is, for example, an integrated circuit (IC) including a function of image processing. The image processor 13 performs image processing to fit the images captured by the camera 11 or the images acquired by the image acquisition part 12 to the display 14.

The image processor 13 includes a size changer 2 as a function of the image processing. The size changer 2 changes sizes of source images, such as the images captured by the camera 11 and the images acquired by the image acquisition part 12 to generate images of which sizes are suitable to display on the display 14.

In the following explanation, "input image" is an original image of which a size is not changed by the size changer 2 and "output image" is an image generated from the original image by changing the size thereof by the size changer 2. The following explanation describes a case where the size changer 2 enlarges a size of the input image to generate the output image. However, the technology described below may be used for a case where the size changer 2 reduces the size of the input image to generate the output image.

Figure 2:
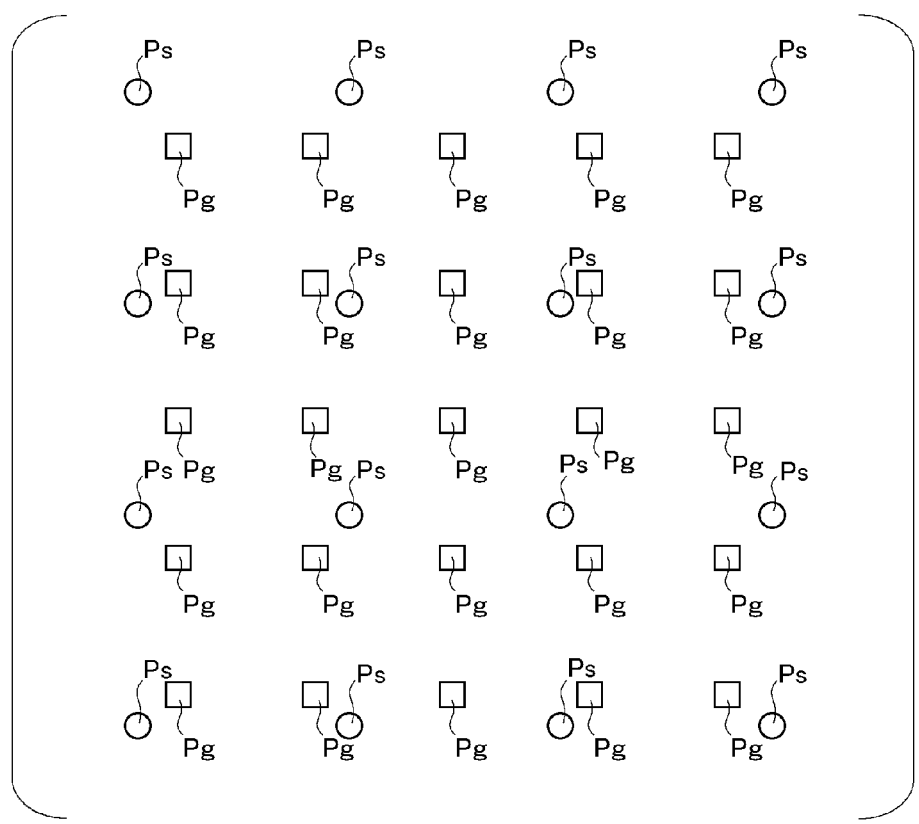
FIG. 2 illustrates locations of pixels of an input image and locations of pixels of an output image.

FIG. 2 illustrates locations of pixels of the input image and locations of pixels of the output image. In FIG. 2, a circle-shaped pixel Ps represents the location of the pixel of the input image and a square-shaped pixel Pg represents the location of the pixel of the output image (also in subsequent drawings).

A location of each pixel of the image and intervals between neighboring pixels are defined by a size of the image (pixels in a horizontal direction and in a vertical direction). A size of the input image is different from a size of the output image. Therefore, as shown in FIG. 2, the locations of the pixels Ps of the input image are different from the locations of the pixels Pg of the output image. Thus, values (luminance and color difference value) of the pixels Pg of the output image are derived in an interpolation process, using values of the plural pixels Pg of the input image in a vicinity of the pixel Pg.

Bilinear interpolation or a bicubic interpolation is generally used as a method for such an interpolation process. The bilinear interpolation is a method of deriving a value of a pixel, using 2×2 pixels (four pixels) in a vicinity of a pixel of which a value is derived by rectilinear interpolation. The bicubic interpolation is a method of deriving a value of a pixel based on a predetermined arithmetic expression, using 4×4 pixels (16 pixels) in a vicinity of a pixel of which a value is derived. These conventional interpolations interpolate a value of a pixel in the vertical direction and in the horizontal direction of the image. More concretely, these conventional interpolations interpolate the value in one of the vertical direction and the horizontal direction and then interpolate the value in the other direction.

On the other hand, being different from the conventional interpolations, the image processing apparatus 1 in this embodiment uses an interpolation that interpolates a value in an inclined line relative to the horizontal direction (hereinafter referred to as "inclination interpolation").

Figure 3:
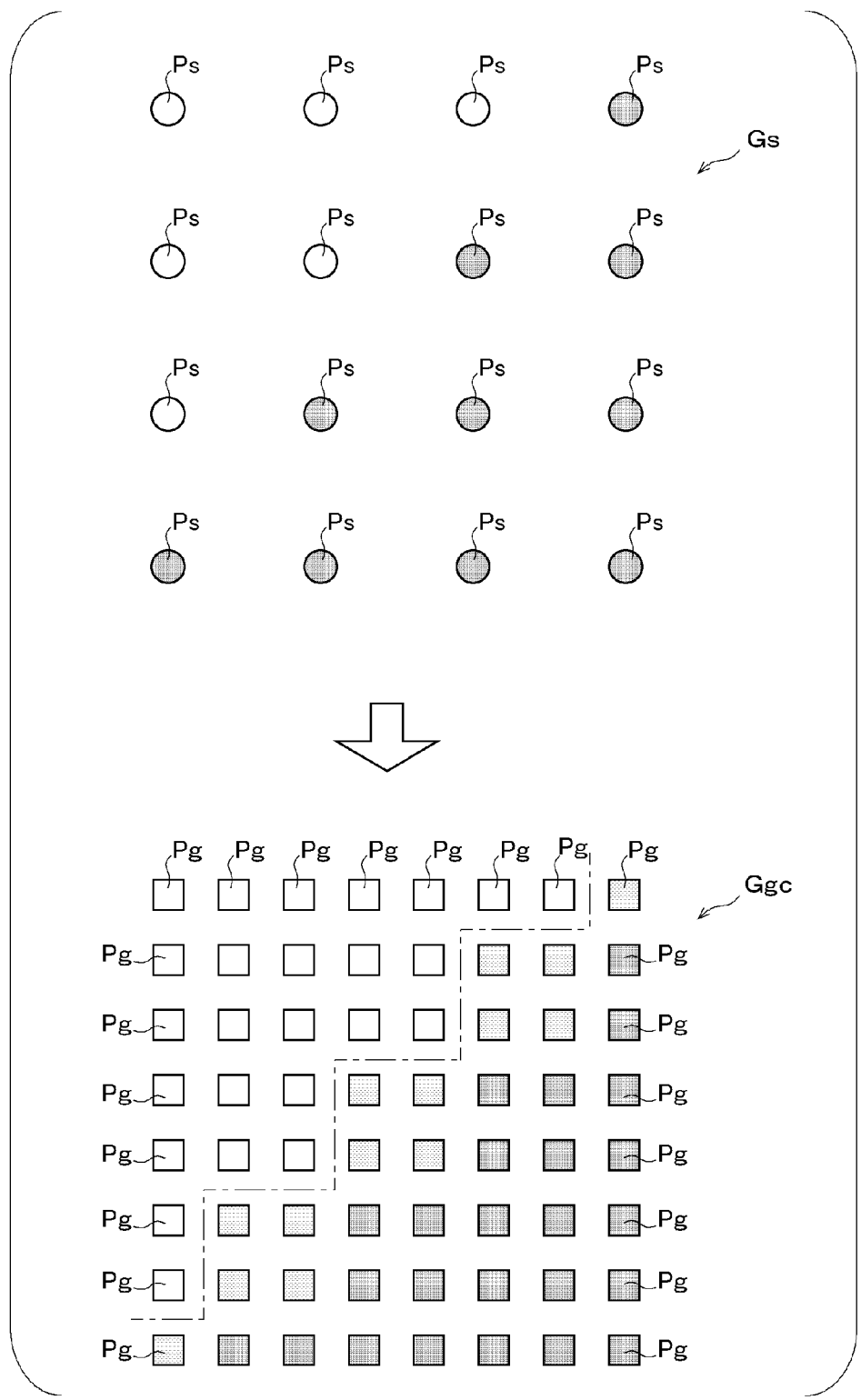
FIG. 3 illustrates an example of an output image generated by a conventional interpolation.
Figure 4:
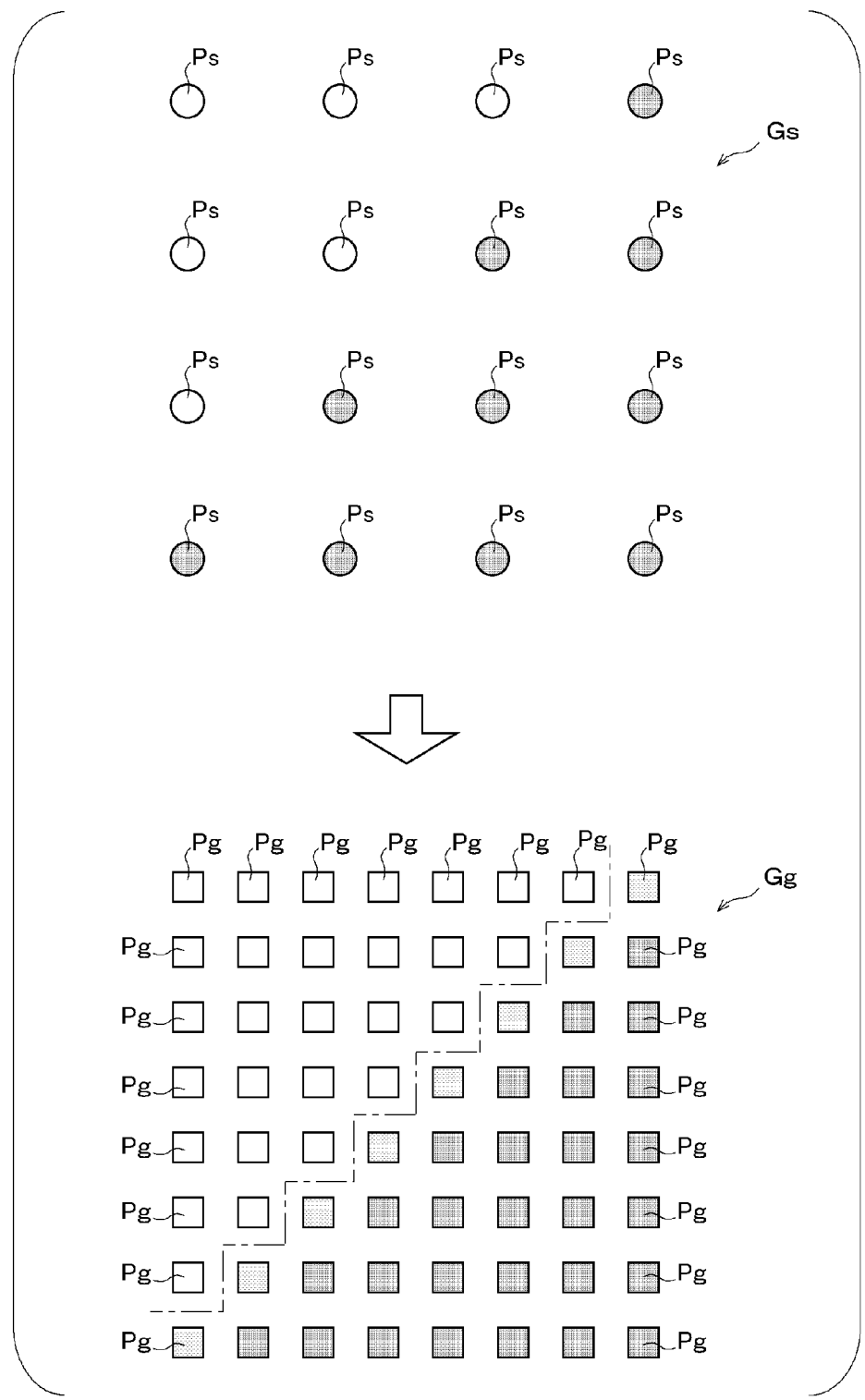
FIG. 4 illustrates an example of an output image generated by an inclination interpolation.

FIG. 3 and FIG. 4 illustrate examples of the output image generated by interpolation based on a same input image Gs. FIG. 3 illustrates an example of an output image Ggc generated by the conventional bilinear interpolation. FIG. 4 illustrates an example of an output image Gg generated by the inclination interpolation. In these figures, a luminance value of each pixel is shown by hatching. The darker the hatching is, the lower the luminance is.

An edge that is an outline of an image of an object is inclined relative to the horizontal direction in the input image Gs in each of FIG. 3 and FIG. 4. As shown in a lower portion of FIG. 3, in the output image Ggc generated by enlarging a size of the input image Gs by a conventional interpolation, jaggies which are jagged outlines or lines occurs in the image. On the other hand, as shown in a lower portion of FIG. 4, in the output image Gg generated by enlarging the size of the input image Gs by the inclination interpolation, the jaggies are greatly reduced as compared to the input image Gs generated by the conventional interpolation. The inclination interpolation is described below in details.

<2. Comprehensive Summary of Inclination Interpolation>

First, a comprehensive summary of the inclination interpolation is described below. Then, each of two processes (edge information derivation process and pixel interpolation process) included in the inclination interpolation will be described in detail.

Figure 5:
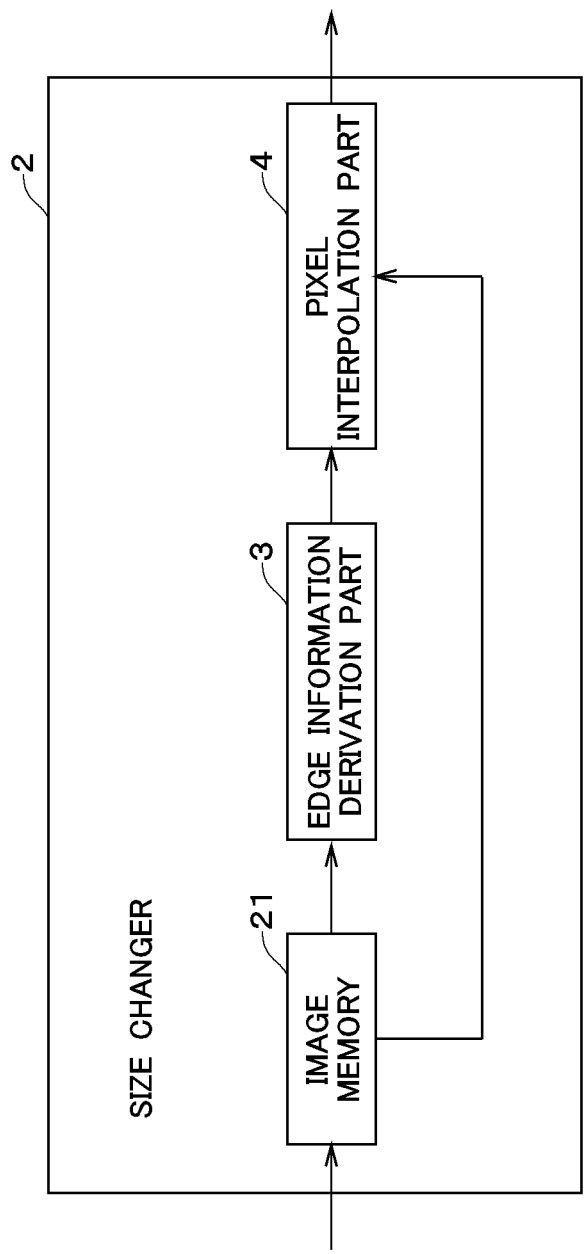
FIG. 5 illustrates a functional configuration of a size changer.

FIG. 5 illustrates a functional configuration of the size changer 2 that performs the inclination interpolation. The size changer 2 includes an image memory 21, an edge information derivation part 3 and a pixel interpolation part 4.

The image memory 21 stores the input image to be processed. The edge information derivation part 3 and the pixel interpolation part 4 perform various image processing, using the input image stored in the image memory 21.

The edge information derivation part 3 performs the edge information derivation process in which edge information of the pixels of the output image is derived based on the input image. Moreover, the pixel interpolation part 4 performs the pixel interpolation process in which values of the pixels of the output image are derived based on the input image.

Figure 6:
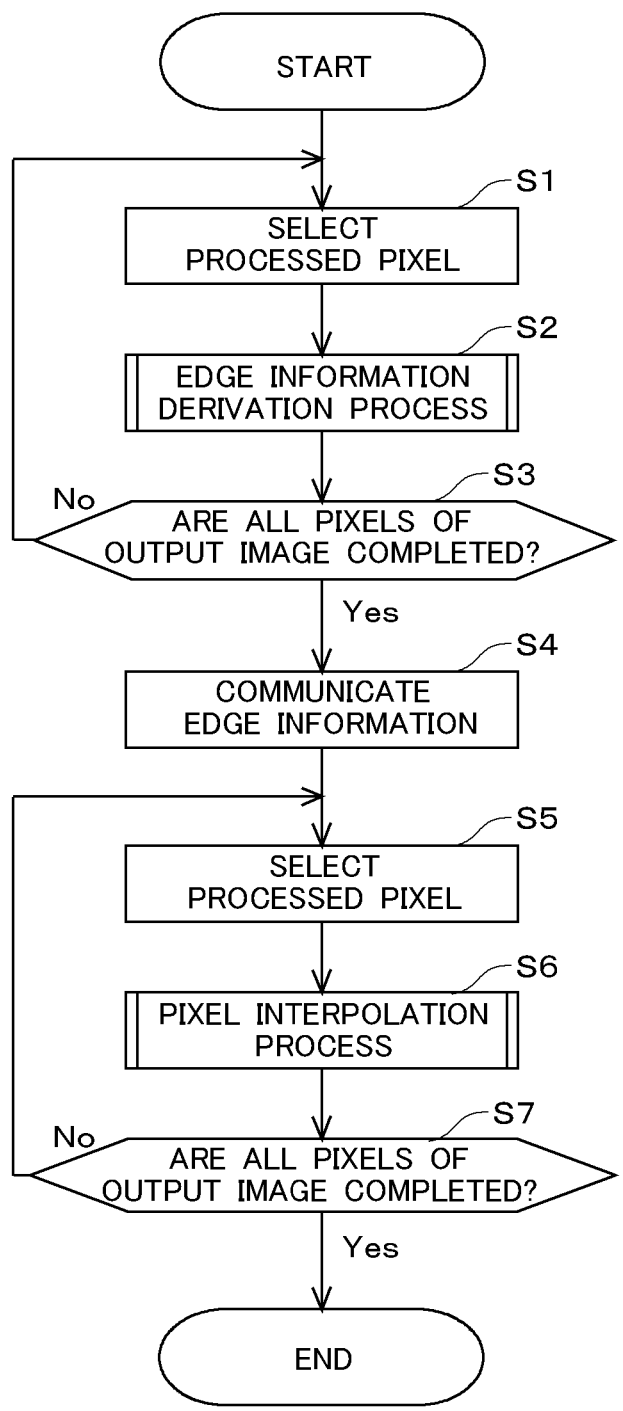
FIG. 6 illustrates an entire flow of a process of the inclination interpolation.

FIG. 6 illustrates an entire flow of the inclination interpolation performed by the size changer 2.

First, the edge information derivation part 3 performs the edge information derivation process of each of the pixels of the output image. The edge information derivation part 3 selects one pixel of the output image to be processed as "processed pixel" (a step S1), and performs the edge information derivation process of the processed pixel (a step S2). The edge information derivation part 3 selects the pixels one after another included in the output image in an order of an alignment (No in a step S3) and repeats the edge information derivation process. Thus, the edge information derivation part 3 performs the edge information derivation process of all the pixels of the output image.

Figure 7:
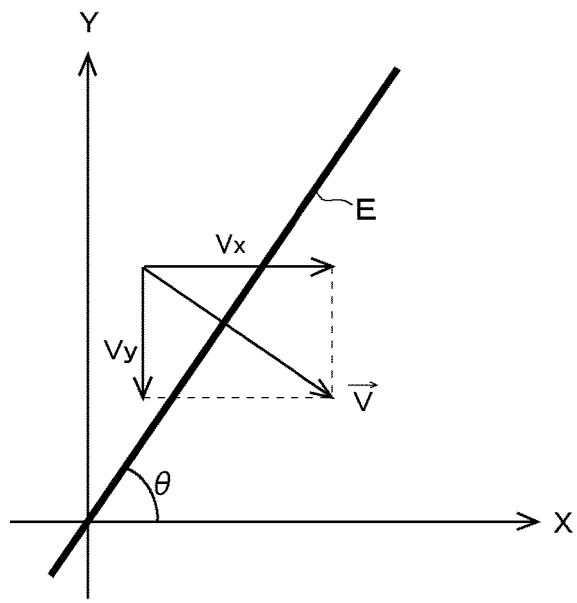
FIG. 7 illustrates a relation between an edge in an image and a vector.

In the step of the edge information derivation process (the step S2), the edge information derivation part 3 derives the edge information of the processed pixel. The edge information derivation part 3 deems an edge in an image as a vector for a calculation purpose. FIG. 7 illustrates a relation between an edge E in an image and a vector V representing the edge E. As shown in FIG. 7, a direction of the vector V is orthogonal to a direction in which the edge E extends. Moreover, a magnitude of the vector V corresponds to a strength of the edge E.

The horizontal direction and the vertical direction of the image are defined as an X-axis direction and Y-axis direction, respectively. The edge information derivation part 3 defines the vector V by a component Vx of the X-axis direction and a component Vy of the Y-axis direction. The edge information derivation part 3 derives the two components Vx and Vy of the vector V based on values (luminance values) of pixels in a vicinity of the processed pixel of the input image (details are described later).

Then, the edge information derivation part 3 categorizes the edge of the processed pixel as one of four patterns based on an angle of the edge relative to the horizontal direction. The categorized pattern serves as a part of the edge information of the processed pixel. Angle $\theta$ represents the angle of the edge relative to the horizontal direction. The edge angle $\theta$ is derived by trigonometric function using the two components Vx and Vy of the vector V and is in a range of $0°<\theta<180°$ in degrees.

Figure 8:
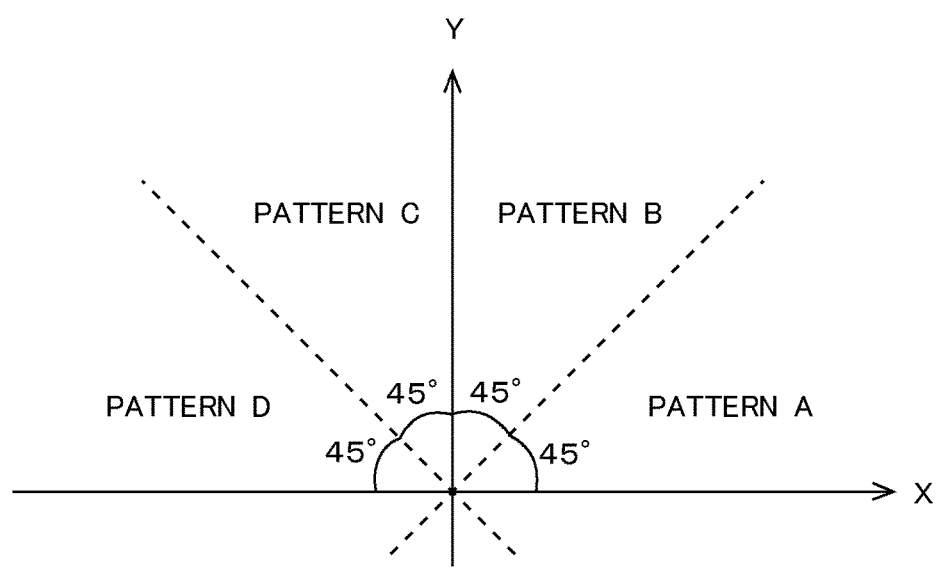
FIG. 8 illustrates patterns into which edges are categorized.

FIG. 8 illustrates the patterns into which the edges are categorized. As shown in FIG. 8, the edge information derivation part 3 categorizes an edge as a pattern A where $0°<\theta<45°$, as a pattern B where $45°<\theta<90°$, as a pattern C where $90°<\theta<135°$ and as a pattern D where $135°<\theta<180°$.

Figure 9:
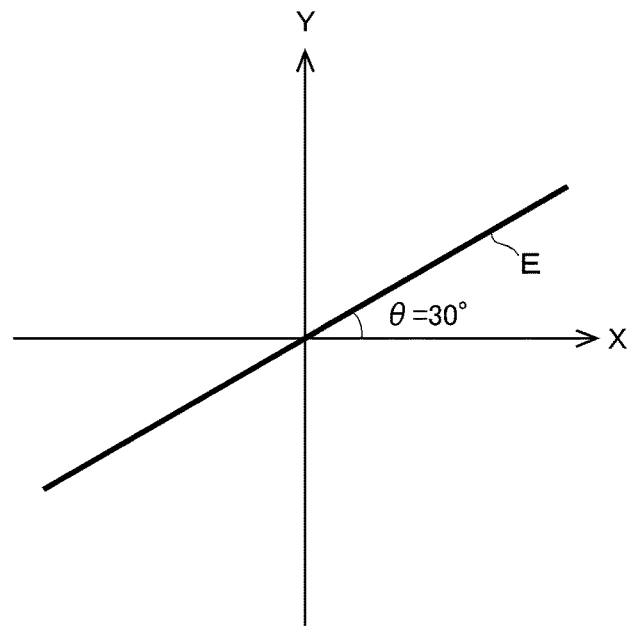
FIG. 9 illustrates an example of an angle of an edge.
Figure 10:
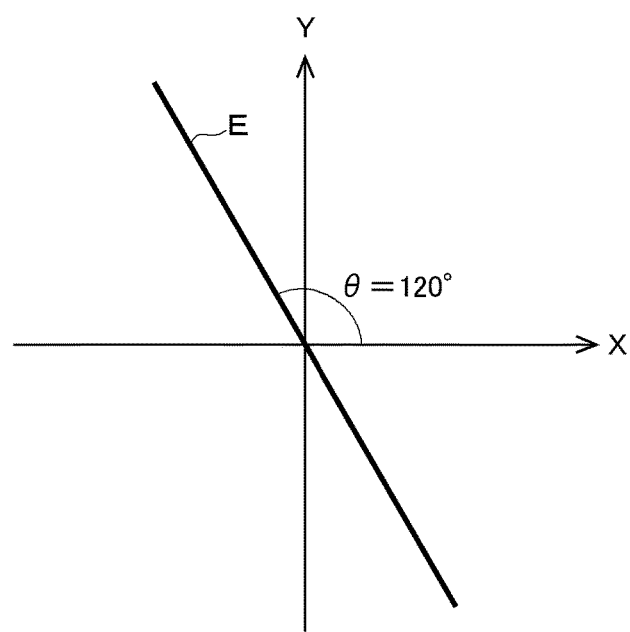
FIG. 10 illustrates an example of an angle of an edge.

For example, as shown in FIG. 9, in a case where the angle $\theta$ of the edge E is $30°$, the edge information derivation part 3 categorizes the edge E as the pattern A. Moreover, as shown in FIG. 10, the angle $\theta$ of the edge E is $120°$, the edge information derivation part 3 categorizes the edge E as the pattern C.

The edge information derivation part 3 performs the edge information derivation process of all the pixels of the output image (Yes in the step S3 in FIG. 6) to derive the edge information (pattern, etc.) of all the pixels for the output image. The edge information derivation part 3 communicates the derived edge information to the pixel interpolation part 4 (a step S4).

Next, the pixel interpolation part 4 performs the pixel interpolation process of each of the pixels of the output image. The pixel interpolation part 4 selects one pixel of the output image as "processed pixel" to be processed (a step S5) and performs the pixel interpolation process of the processed pixel (a step S6). The pixel interpolation part 4 selects the pixels one after another included in the output image in an order of an alignment (No in a step S7) and repeats the pixel interpolation process. Thus, the pixel interpolation part 4 performs the pixel interpolation process of all the pixels of the output image.

In the step of the pixel interpolation process (the step S6), the pixel interpolation part 4 derives a value (luminance value and color difference value) of the processed pixel by performing an interpolation process according to the pattern of the edge of the processed pixel. Each of FIG. 11 to FIG. 14 illustrates the interpolation process performed by the pixel interpolation part 4. FIG. 11, FIG. 12, FIG. 13 and FIG. 14 illustrate the interpolation process in a case of the pattern A, the pattern B, the pattern C and the pattern D, respectively. In any pattern, the pixel interpolation part 4 performs the interpolation process in two steps (a first interpolation process and a second interpolation process). The pixel Ps of the input image is hereinafter referred to as "input pixel."

First, the pixel interpolation part 4 performs the first interpolation process, using values of a plurality of the input pixels Ps aligned in an arranged direction that is one of the horizontal direction and in the vertical direction. Thus, the pixel interpolation part 4 derives each value of a plurality of noted points N1 to N4 on an inclined interpolation line La that extends through a location of a processed pixel Pgt and that is inclined relative to the horizontal direction.

Next, the pixel interpolation part 4 performs the second interpolation process to derive the value of the processed pixel Pgt, using the values of the plurality of noted points N1 to N4 on the inclined interpolation line La derived in the first interpolation process. An arithmetic expression for bicubic interpolation is used for both of the first interpolation process and the second interpolation process.

The arranged direction of the plurality of input pixels Ps for the first interpolation process and an angle of the inclined interpolation line La relative to the horizontal direction differ, depending on a pattern of the edge of the processed pixel. Angle $\alpha$ represents the angle of the inclined interpolation line La relative to the horizontal direction. The angle $\alpha$ of the inclined interpolation line La is in a range of $0°<\alpha<180°$ in degrees.

Figure 11:
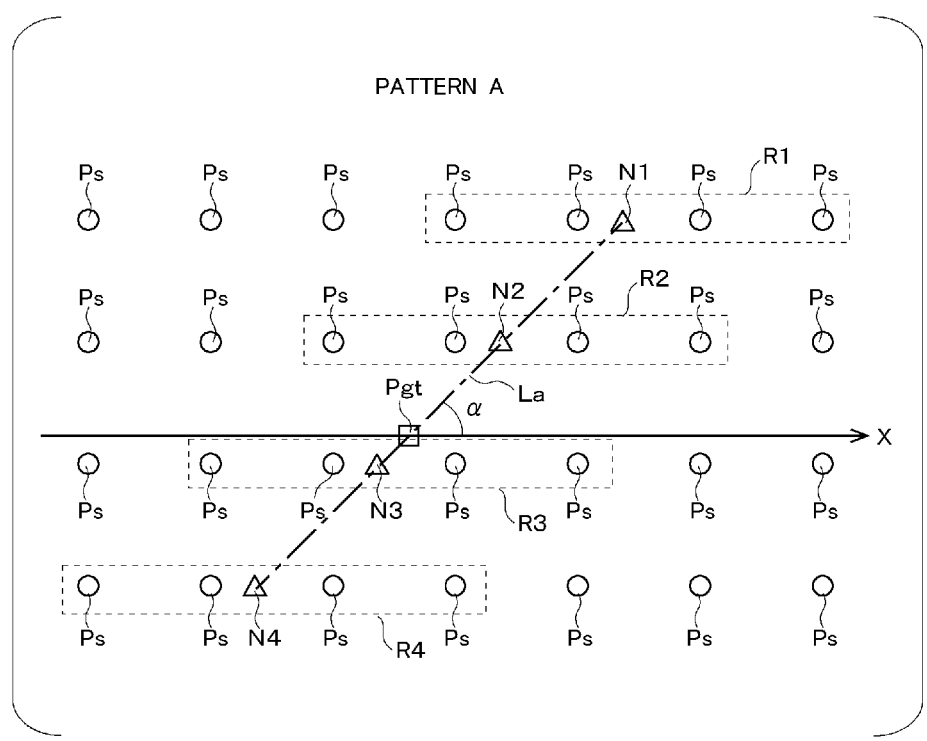
FIG. 11 illustrates an interpolation process in a case of a pattern A.

As shown in FIG. 11, in a case of the pattern A ($0°<\theta<45°$), "horizontal direction" is used as the arranged direction of the plurality of input pixels Ps for the first interpolation process. Moreover, the angle $\alpha$ of the inclined interpolation line La is set in the range of $0°<\alpha<90°$ so as to be inclined upward to a right.

The pixel interpolation part 4 performs the first interpolation process of each of four regions R1, R2, R3 and R4 in FIG. 11, using four input pixels Ps aligned in the "horizontal direction." Therefore, the first interpolation process uses 16 input pixels Ps of 4×4. Thus, the pixel interpolation part 4 derives a value of the noted point N1 in the region R1, a value of the noted point N2 in the region R2, a value of the noted point N3 in the region R3 and a value of the noted point N4 in the region R4. The noted points N1, N2, N3 and N4 are four points on the inclined interpolation line La inclined "upward to the right," extending through the processed pixel Pgt. Then, the pixel interpolation part 4 performs the second interpolation process, using the values of the four noted points N1 to N4 on the inclined interpolation line La, to derive the value of the processed pixel Pgt.

Figure 12:
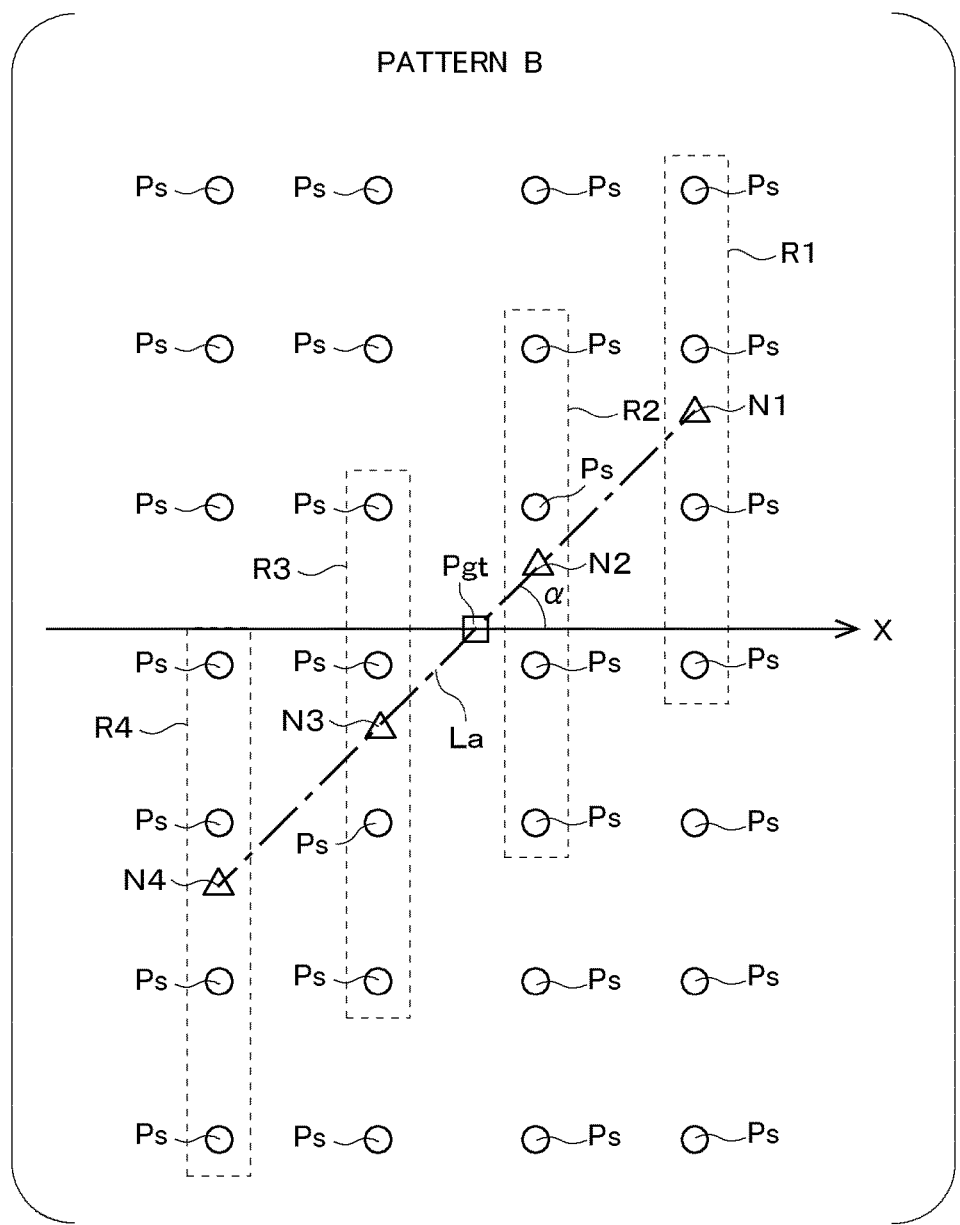
FIG. 12 illustrates an interpolation process in a case of a pattern B.

As shown in FIG. 12, in a case of the pattern B (45°<θ<90°), "vertical direction" is used as the arranged direction of the plurality of input pixels Ps for the first interpolation process. Moreover, the angle α of the inclined interpolation line La is set in the range of 0°<α<90° so as to be inclined upward to the right.

The pixel interpolation part 4 performs the first interpolation process of each of four regions R1, R2, R3 and R4 in FIG. 12, using four input pixels Ps aligned in the "vertical direction," to derive the values of the noted points N1 to N4. The noted points N1, N2, N3 and N4 are four points on the inclined interpolation line La inclined "upward to the right," extending through the processed pixel Pgt. Then, the pixel interpolation part 4 performs the second interpolation process, using the values of the four noted points N1 to N4 on the inclined interpolation line La, to derive the value of the processed pixel Pgt.

Figure 13:
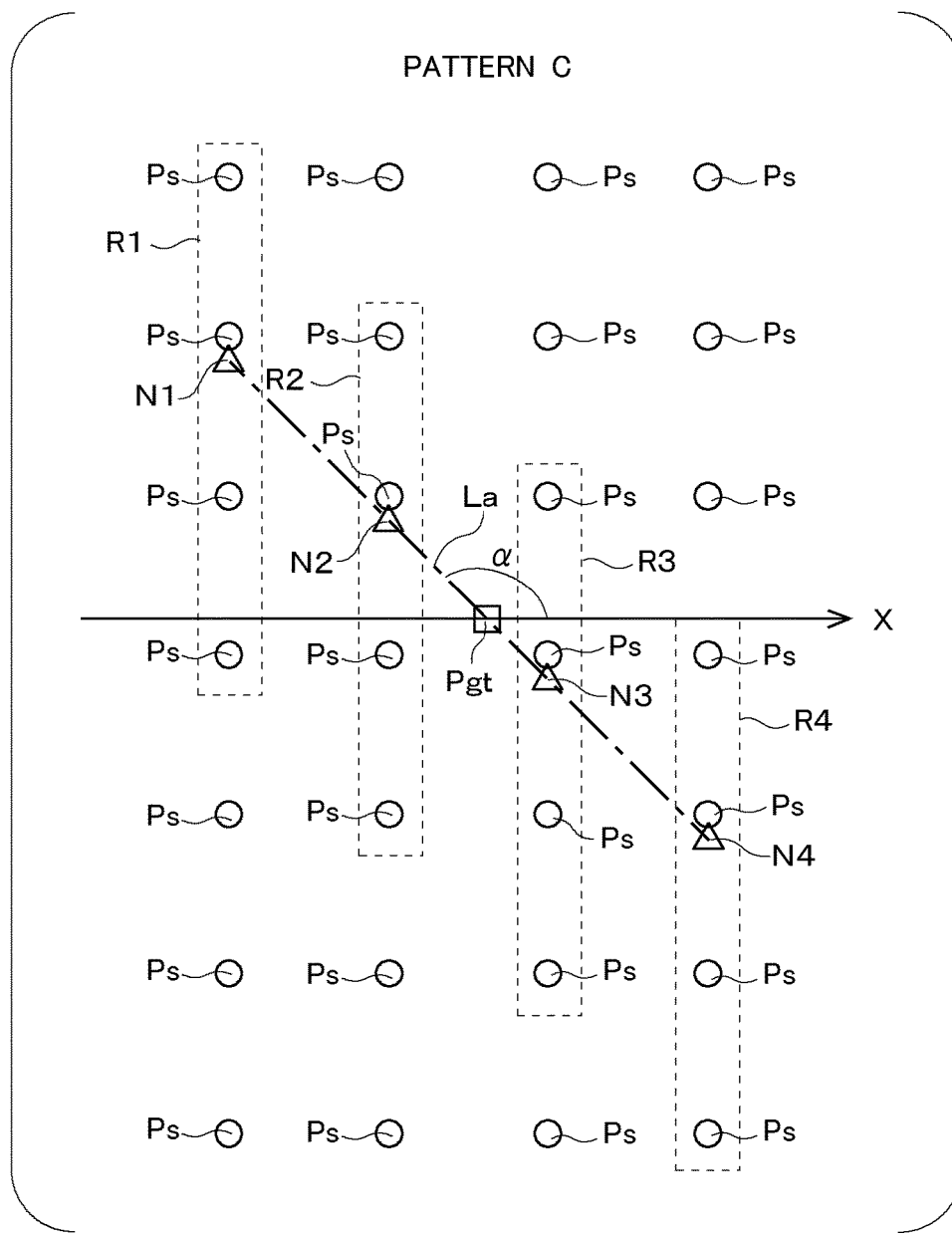
FIG. 13 illustrates an interpolation process in a case of a pattern C.

As shown in FIG. 13, in a case of the pattern C (90°<θ<135°), "vertical direction" is used as the arranged direction of the plurality of input pixels Ps for the first interpolation process. Moreover, the angle α of the inclined interpolation line La is set in the range of 90°<α<180° so as to be inclined downward to the right.

The pixel interpolation part 4 performs the first interpolation process of each of four regions R1, R2, R3 and R4 in FIG. 13, using four input pixels Ps aligned in the "vertical direction," to derive the values of the noted points N1 to N4. The noted points N1, N2, N3 and N4 are four points on the inclined interpolation line La inclined "downward to the right," extending through the processed pixel Pgt. Then, the pixel interpolation part 4 performs the second interpolation process, using the values of the four noted points N1 to N4 on the inclined interpolation line La, to derive the value of the processed pixel Pgt.

Figure 14:
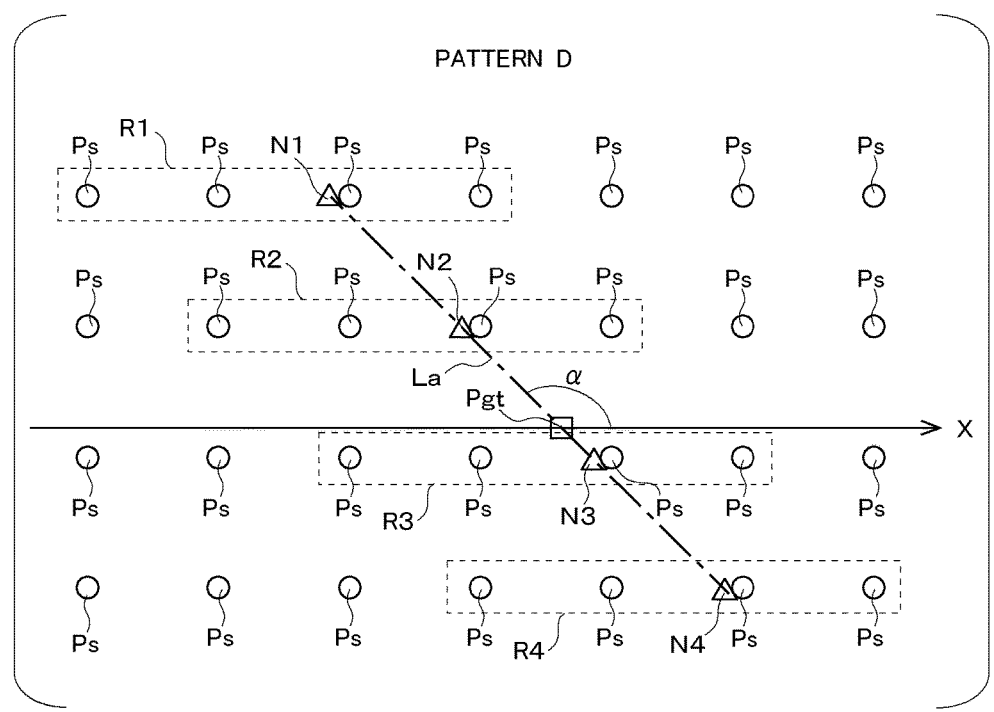
FIG. 14 illustrates an interpolation process in a case of a pattern D.

As shown in FIG. 14, in a case of the pattern D (135°<θ<180°), "horizontal direction" is used as the arranged direction of the plurality of input pixels Ps for the first interpolation process. Moreover, the angle α of the inclined interpolation line La is set in the range of 90°<α<180° so as to be inclined downward to the right.

The pixel interpolation part 4 performs the first interpolation process of each of four regions R1, R2, R3 and R4 in FIG. 14, using four input pixels Ps aligned in the "horizontal direction," to derive the values of the noted points N1 to N4. The noted points N1, N2, N3 and N4 are four points on the inclined interpolation line La inclined "downward to the right," extending through the processed pixel Pgt. Then, the pixel interpolation part 4 performs the second interpolation process, using the values of the four noted points N1 to N4 on the inclined interpolation line La, to derive the value of the processed pixel Pgt.

The pixel interpolation part 4 performs the pixel interpolation process of all the pixels of the output image (Yes in the step S7 in FIG. 6) to derive the values of all the pixels for the output image. Thus, the size changer 2 generates the output image of which a size is changed from the size of the input image.

As described above, the pixel interpolation part 4 of the image processing apparatus 1 in this embodiment performs the first interpolation process, using the values of the plurality of the input pixels Ps aligned in the arranged direction that is the horizontal direction or the vertical direction. Thus, the pixel interpolation part 4 derives each of the values of the plurality of noted points N1 to N4 on the inclined interpolation line La that extends through the location of the processed pixel Pgt and that is inclined relative to the horizontal direction. Moreover, the pixel interpolation part 4 performs the second interpolation process to derive the value of the processed pixel Pgt, using the values of the plurality of noted points N1 to N4 on the inclined interpolation line La.

The arranged direction, "horizontal direction" or "vertical direction," of the input pixels Ps is selected for the first interpolation process, based on the pattern of the edge (i.e. angle θ of the edge) of the processed pixel. In a case of the pattern A or the pattern D (0°<θ<45° or 135°<θ<180°), "horizontal direction" is selected as the arranged direction of the input pixels Ps for the first interpolation process. In a case of the pattern B or the pattern C (45°<θ<135°), "vertical direction" is selected as the arranged direction of the input pixels Ps for the first interpolation process In other words, in a case where an absolute value of inclination of the edge of the processed pixel relative to the horizontal direction is relatively small (in a case where the inclination is gentle), "horizontal direction" is selected as the arranged direction of the input pixels Ps for the first interpolation process. On the other hand, in a case where the absolute value of the inclination of the edge of the processed pixel relative to the horizontal direction is relatively great (in a case where the inclination is sharp), "vertical direction" is selected as the arranged direction of the input pixels Ps for the first interpolation process. Thus, since the first interpolation process is performed in a direction close to a direction in which the edge extends, jaggies can be reduced effectively.

Moreover, the angle α of the inclined interpolation line La relative to the horizontal direction is set based on the pattern of the edge of the processed pixel (i.e. angle θ of the edge). In a case of the pattern A or the pattern B (0°<θ<90°), the angle α of the inclined interpolation line La is set in the range of 0°<α<90°. On the other hand, in a case of the pattern C or the pattern D (90°<θ<180°), the angle α of the inclined interpolation line La is set in the range of 90°<α<180°. In other words, in a case where the edge of the processed pixel is inclined "upward to the right," the inclined interpolation line La is set so as also to be inclined "upward to the right." On the other hand, in a case where the edge of the processed pixel is inclined "downward to the right," the inclined interpolation line La is set so as also be inclined "downward to the right." As a result, since the second interpolation process is performed in a direction close to a direction in which the edge extends, jaggies can be reduced effectively.

<3. Edge Information Derivation Process>

Figure 15:
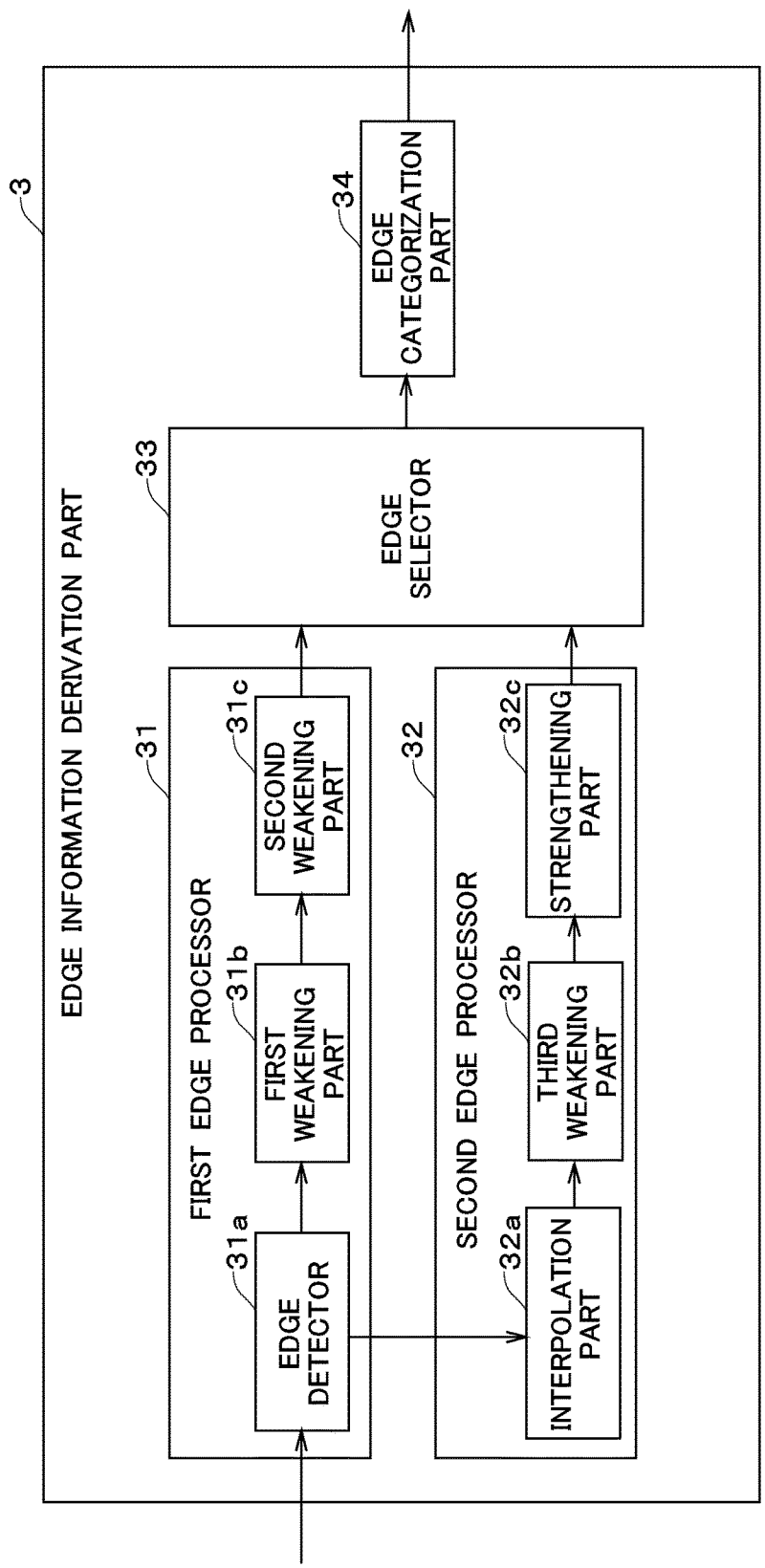
FIG. 15 illustrates a configuration of an edge information derivation part.

Next, the edge information derivation process (the step S2 in FIG. 6) is described further in detail. FIG. 15 illustrates a detailed configuration of the edge information derivation part 3 (refer to FIG. 5) that performs the edge information derivation process.

The edge information derivation part 3 includes a first edge processor 31, a second edge processor 32, an edge selector 33 and an edge categorization part 34.

Figure 16:
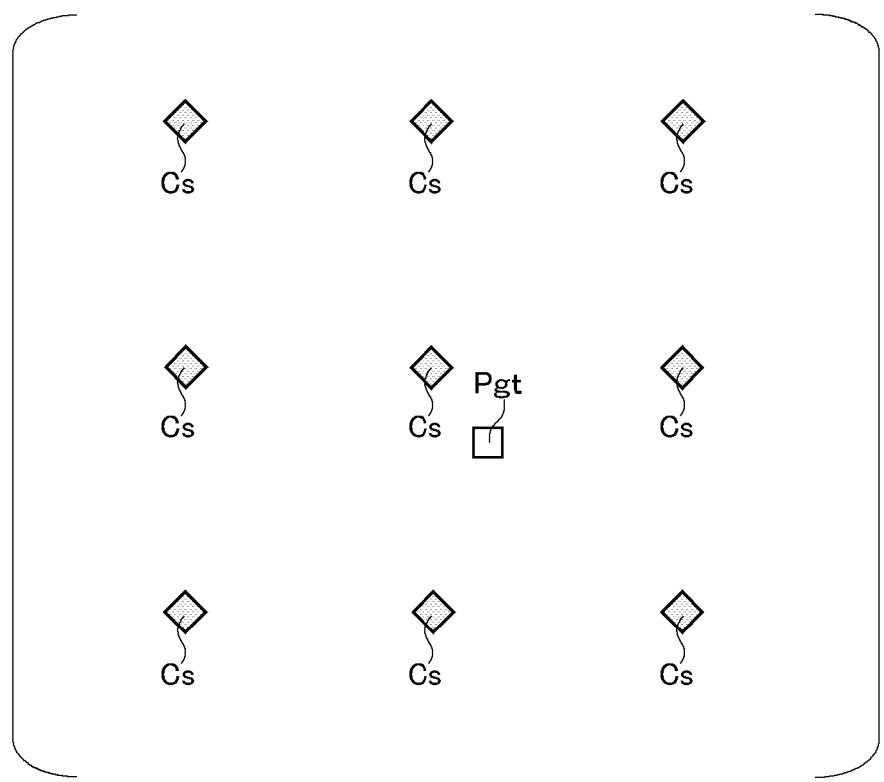
FIG. 16 illustrates a plurality of vicinity locations in a vicinity of a processed pixel.

The first edge processor 31, as shown in FIG. 16, detects each of edges at a plurality of vicinity locations Cs (hereinafter referred to as "vicinity edge") in a vicinity of the processed pixel Pgt and performs a process of a plurality of vicinity edges. The first edge processor 31 includes an edge detector 31a, a first weakening part 31b and a second weakening part 31c. Details of those functions will be described later. Each of the vicinity locations Cs is shown by a hatched rhombus in FIG. 16 (also in subsequent drawings).

The second edge processor 32 detects the edge at a location of the processed pixel Pgt (hereinafter referred to as "self-location edge") and performs the process of the self-location edge. The second edge processor 32 includes an interpolation part 32a, a third weakening part 32b and a strengthening part 32c. Details of those functions will be described later.

The edge selector 33 selects an edge relating to the processed pixel (hereinafter referred to as "processed edge") that is used for a subsequent process, from amongst the plurality of vicinity edges processed by the first edge processor 31 and the self-location edge processed by the second edge processor 32. The edge selector 33 selects, as the processed edge, an edge having a greatest influence on the processed pixel Pgt. More concretely, the edge selector 33 selects, from the plurality of vicinity edges and the self-location edge, one edge having a greatest strength as the processed edge."

Moreover, the edge categorization part 34 categorizes the processed edges of the processed pixel Pgt as one of the four patterns in FIG. 8. The pattern as which the processed edge is categorized is used as a reference in the pixel interpolation process (the step S6 in FIG. 6) that is performed by the pixel interpolation part 4.

Figure 17:
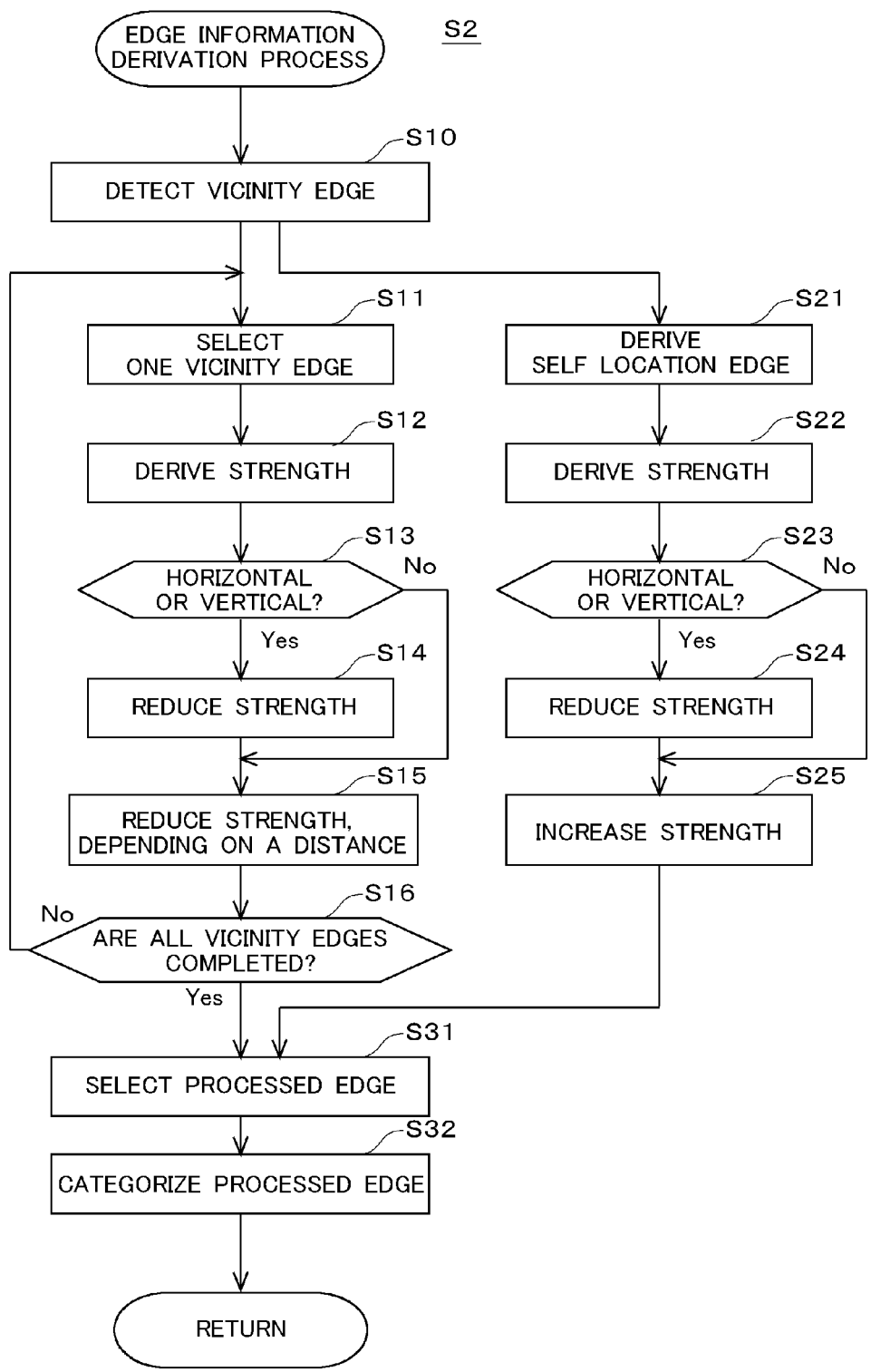
FIG. 17 illustrates a detailed flow of an edge information derivation process.

FIG. 17 illustrates a detailed flow of the edge information derivation process (the step S2 in FIG. 6). As described above, the edge information derivation process is performed for all the pixels of the output image.

First, the edge detector 31a of the first edge processor 31 detects each of the vicinity edges at the plurality of vicinity locations Cs in the vicinity of the processed pixel Pgt, based on the input pixels Ps in the vicinity of the processed pixel Pgt (a step S10).

Figure 18:
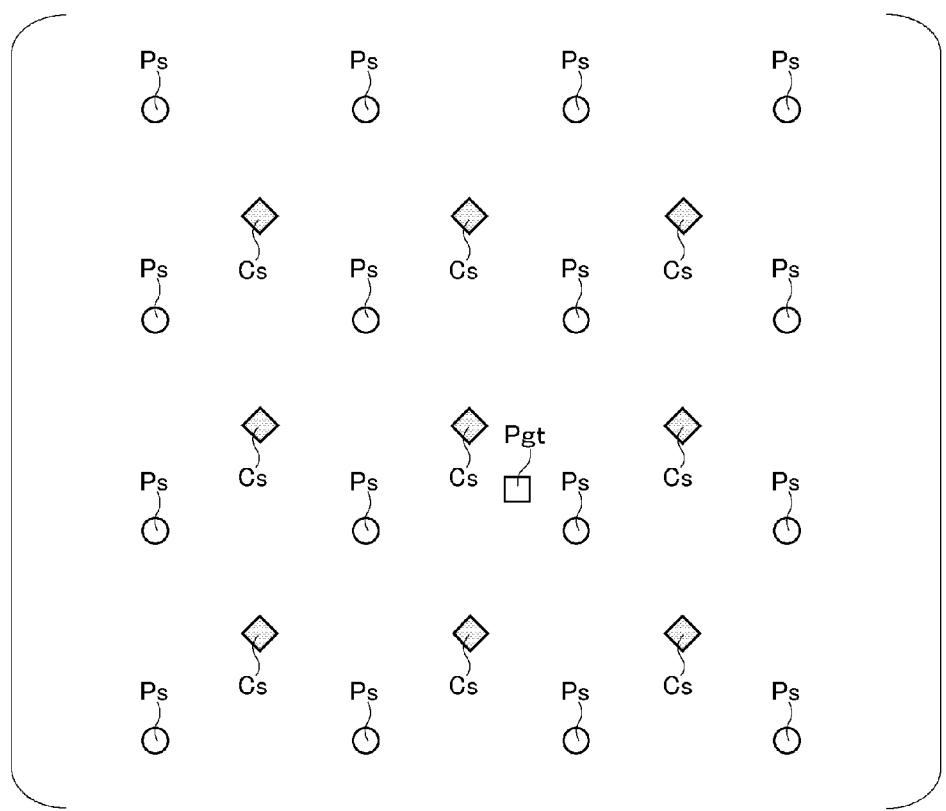
FIG. 18 illustrates input pixels in a vicinity of a processed pixel.

FIG. 18 illustrates the input pixels Ps in the vicinity of the processed pixel Pgt. The edge detector 31a uses, as a reference, the input pixels Ps of 4×4 in the vicinity of the processed pixel Pgt. The edge detector 31a defines, as the vicinity locations Cs to be noted, centers of smallest rectangles (squares) formed by four input pixels Ps of these 16 input pixels Ps. Then, the edge detector 31a detects each of edges at the vicinity locations Cs of 3×3, as the "vicinity edge."

Figure 19:
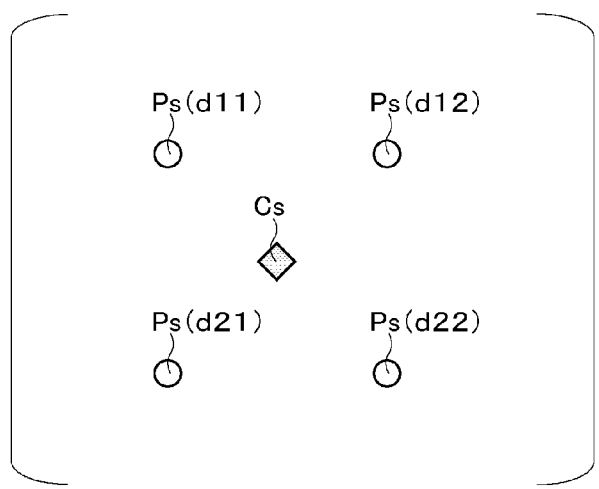
FIG. 19 illustrates a method of deriving a vector of a vicinity edge.

The edge detector 31a derives the vector V of the vicinity edge based on a luminance value difference in the X-axis direction and a luminance value difference in the Y-axis direction of the four input pixels Ps surrounding the vicinity location Cs. The edge detector 31a practically detects the vicinity edge by deriving the vector V. If values in parentheses in FIG. 19 are luminance values of the four input pixels Ps surrounding the vicinity location Cs, the edge detector 31a derives the component Vx in the X-axis direction and the component Yy in the Y-axis direction of the vector V of the vicinity edge by expressions (1) and (2) below.

$$Vx=(d12+d22)-(d11+d21) \quad (1)$$

$$Vy=(d11+d12)-(d21+d22) \quad (2)$$

Once the edge detector 31a detects the vicinity edge, the first edge processor 31 and the second edge processor 32 perform a process in parallel. Steps S11 to S16 of the process in FIG. 17 are performed by the first edge processor 31 and steps S21 to S25 of the process in FIG. 17 are performed by the second edge processor 32.

The first weakening part 31b and the second weakening part 31c of the first edge processor 31 adjust strengths of the plurality of vicinity edges. The interpolation part 32a of the second edge processor 32 derives the self-location edge and the third weakening part 32b and the strengthening part 32c of the second edge processor 32 adjusts a strength of the self-location edge. Strengths of edges are adjusted in preparation for selection of the processed edge by the edge selector 33 in a step S31.

The first edge processor 31 first selects one vicinity edge from amongst the plurality of vicinity edges, as "processed vicinity edge" to be processed (a step S11). The first weakening part 31b derives a strength of the processed vicinity edge (a step S12).

The first weakening part 31b, for example, derives a strength Se of the processed vicinity edge by an expression (3) below, using the two components Vx and Vy of the vector V of the processed vicinity edge. In the expression (3), I is a predetermined constant.

$$Se=(Vx\textasciicircum 2+Vy\textasciicircum 2)/I \quad (3)$$

Figure 20:
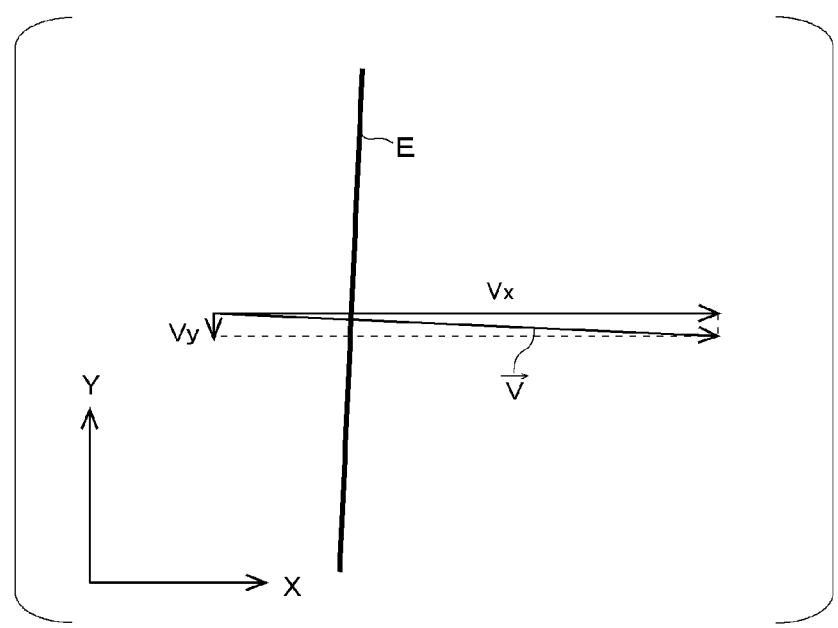
FIG. 20 illustrates an example of an edge extending substantially in a vertical direction.

Next, the first weakening part 31b determines whether or not the processed vicinity edge extends substantially in the horizontal direction or in the vertical direction (a step S13). As shown in FIG. 20, a case where a processed vicinity edge E extends substantially in the horizontal direction or in the vertical direction is equivalent to a case where one of the two components Vx and Vy of the vector V of the processed vicinity edge is very small. Therefore, the first weakening part 31b uses, as a reference value, a smaller component of the two components Vx and Vy. In a case where the reference value is smaller than a predetermined threshold, the first weakening part 31b determines that the processed vicinity edge extends substantially in the horizontal direction or in the vertical direction.

In a case where the processed vicinity edge extends substantially in the horizontal direction or in the vertical direction, the first weakening part 31b reduces the strength of the processed vicinity edge by an expression (4) below (a step S14). In the expression (4), Se represents a strength of the edge and J represents a coefficient (0<J<1).

$$Se=Se \cdot J \quad (4)$$

Figure 21:
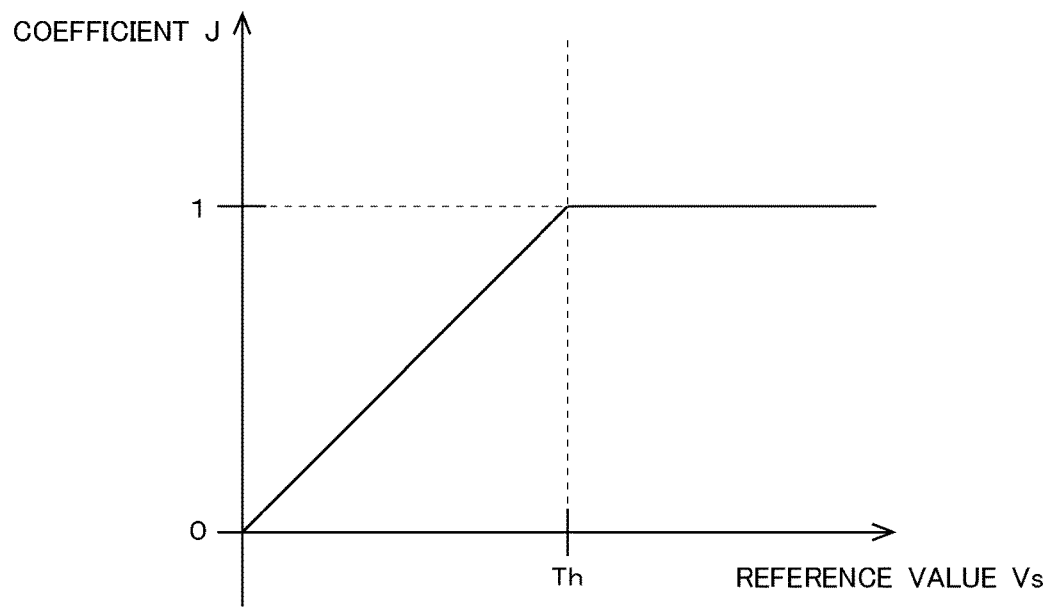
FIG. 21 illustrates coefficient J.

In the expression (4), the coefficient J is derived by an expression (5) below where Vs is the reference value (smaller component of the components Vx and Vy) and Th is the threshold to be compared to the reference value Vs. In other words, the coefficient J is shown in a graph in FIG. 21.

$$J=Vs/Th \quad (5)$$

As described above, the first weakening part 31b reduces the strength Se of the processed vicinity edge extending substantially in the horizontal direction or in the vertical direction. Since few jaggies occur in such a processed vicinity edge, the edge selector 33 can be prevented from selecting, as the processed edge, an edge on which few jaggies occur.

Next, the second weakening part 31c reduces the strength Se of the processed vicinity edge, depending on a distance from the processed pixel Pgt to the vicinity location Cs of the processed vicinity edge (a step S15). The second weakening part 31c reduces the strength Se of the processed vicinity edge by an expression (6) below. In the expression (6), K is a predetermined constant and L is a distance from the processed pixel Pgt to the vicinity location.

$$Se=Se \cdot (K-L)/K \quad (6)$$

Since the vicinity location Cs of the processed vicinity edge is away from the processed pixel Pgt, as the distance is greater, the processed vicinity edge has a less influence on the processed pixel Pgt. The greater the distance from the vicinity location Cs to the processed pixel Pgt is, the more the second weakening part 31c reduces the strength Se of the processed vicinity edge. Therefore, the strength Se of the processed vicinity edge can be adjusted in consideration of less influence on the processed pixel Pgt, according to the distance. As a result, the edge selector 33 properly selects an edge having an influence on the processed pixel Pgt as the processed edge.

The first edge processor 31 performs the steps S11 to S15 described above for each of the plurality of vicinity edges (No in a step S16). Therefore, the strength Se of the vicinity edge is reduced, depending on the direction in which the edge extends and the distance between the processed pixel Pgt and the vicinity location. Once the first edge processor 31 ends the process of all the vicinity edges (Yes in the step S16), the process moves to the step S31.

Figure 22:
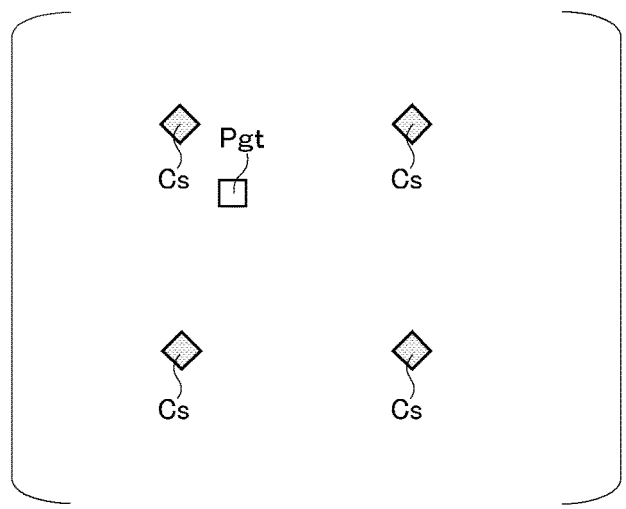
FIG. 22 illustrates a method of deriving a vector of a self-location edge.

On the other hand, the interpolation part 32a of the second edge processor 32 detects the self-location edge (a step S21). The interpolation part 32a practically detects the self-location edge by deriving the vector V of the self-location edge. As shown in FIG. 22, the interpolation part 32a derives the vector V of the self-location edge by linearly interpolating the vectors V of the vicinity edges at the four vicinity locations Cs closest to the processed pixel Pgt. Then, the interpolation part 32a derives the strength Se of the self-location edge by the expression (3) described above (a step S22).

Next, the third weakening part 32b determines whether or not the self-location edge extends substantially in the horizontal direction or in the vertical direction (a step S23). Then, in a case where the self-location edge extends substantially in the horizontal direction or in the vertical direction, the third weakening part 32b reduces the strength Se of the self-location edge (a step S24). Concretely, the third weakening part 32b performs the same process as the first weakening part 31b does. Moreover, the threshold Th that is used by the third weakening part 32b may be different from the threshold TH that is used by the first weakening part 31b.

As described above, in the case where the self-location edge extends substantially in the horizontal direction or in the vertical direction, the third weakening part 32b reduces the strength Se of the self-location edge. As a result, the edge selector 33 can be prevented from selecting, as the processed edge, an edge on which few jaggies occur.

Next, the strengthening part 32c increases the strength Se of the self-location edge (a step S25). The strengthening part 32c increases the strength Se of the self-location edge by an expression (7) below. In the expression (7), M is a coefficient (1<M).

$$Se = Se \cdot M \quad (7)$$

Since the self-location edge is an edge at a location of the processed pixel, the self-location edge has a greater influence on the processed pixel as compared to the vicinity edges. Since the strengthening part 32c increases the strength Se of the self-location edge, the strength Se of the self-location edge can be properly adjusted, depending on a degree of the influence thereof. As a result, the edge selector 33 properly selects an edge having a greatest influence on the processed pixel as the processed edge. Once the strengthening part 32c ends the process, the process moves to the step S31.

Once the process performed by both of the first edge processor 31 and the second edge processor 32 ends, the edge selector 33 selects the processed edge of the processed pixel (the step S31). The edge selector 33 selects the processed edge from amongst the plurality of vicinity edges of which the strengths Se have been adjusted by the first edge processor 31 and the self-location edge of which the strength Se has been adjusted by the second edge processor 32. As described above, the edge selector 33 selects an edge having a greatest strength Se as the processed edge.

The edge selector 33 selects the processed edge from amongst not only the self-location edge that is an edge at the location of the processed pixel but also the vicinity edges that are edges at the plurality of vicinity locations in the vicinity of the processed pixel. Therefore, the edge selector 33 properly selects, as the processed edge of the processed pixel, an edge having the greatest influence on the processed pixel.

Next, the edge categorization part 34 categorizes the processed edge of the processed pixel as one of the four patterns in FIG. 8 (a step S32). As described with reference to FIG. 8, the edge categorization part 34 categorizes the processed edge based on the angle θ of the processed edge relative to the horizontal direction.

The pattern of the processed edge categorized by the edge categorization part 34 serves as a part of the edge information that is communicated to the pixel interpolation part 4. The edge information communicated to the pixel interpolation part 4 may include the angle θ, the strength Se, the components Vx and Vy of the vector V, etc.

Moreover, in a case where the processed edge cannot be categorized as one of the four patterns because the angle θ of the processed edge is 45° or 135°, a categorization result of the self-location edge at the processed pixel, instead of the processed edge, may be used as a pattern of an edge of the processed pixel.

<4. Pixel Interpolation Process>

Figure 23:
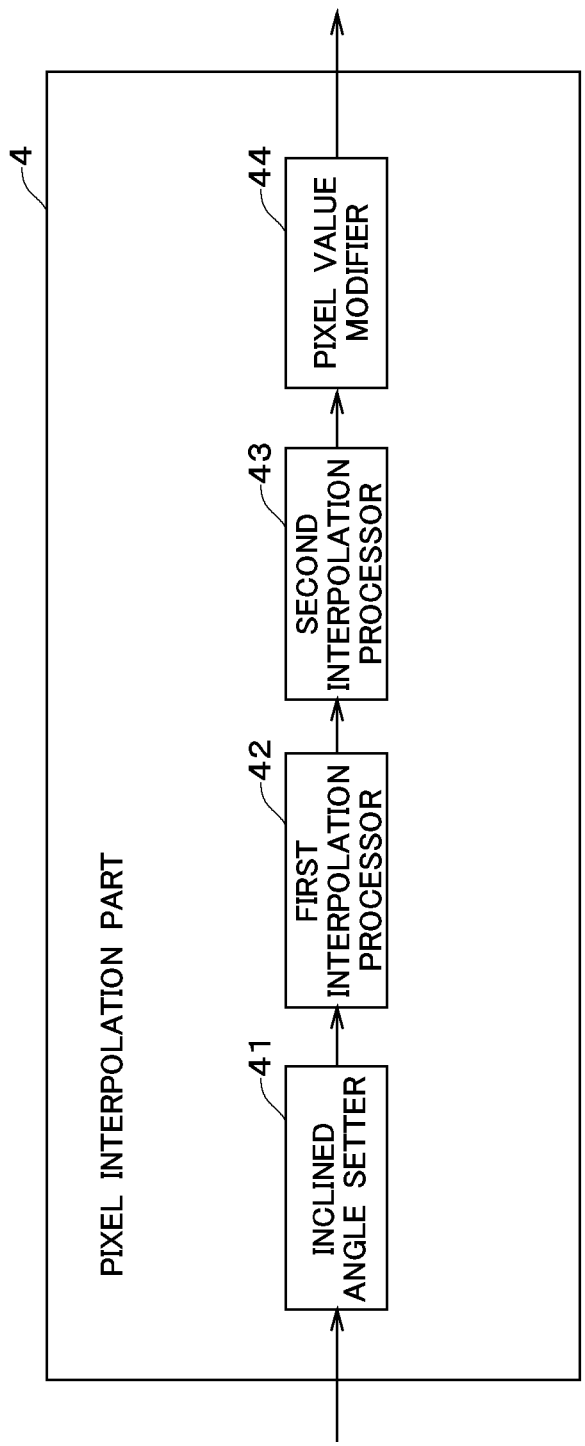
FIG. 23 illustrates a configuration of a pixel interpolation part.

Next, the pixel interpolation process (the step S6 in FIG. 6) is described further in detail. FIG. 23 illustrates a detailed configuration of the pixel interpolation part 4 (refer to FIG. 5) that performs the pixel interpolation process.

The pixel interpolation part 4 includes an inclined angle setter 41, a first interpolation processor 42, a second interpolation processor 43 and a pixel value modifier 44.

The inclined angle setter 41 sets the angle α of the inclined interpolation line La relative to the horizontal direction. In the inclination interpolation, the interpolation performed for the inclined interpolation line La at 45° or 135° produces greatest effects, and the effects of the interpolation process becomes smaller as the angle α of the inclined interpolation line La becomes closer to the horizontal direction or the vertical direction (as the angle α of the inclined interpolation line La is further away from 45° or 135°). Some among the effects of the interpolation process are fewer jaggies and amplification of noise. Therefore, the inclined angle setter 41 reduces the effects of the interpolation process by changing the angle α of the inclined interpolation line La from the reference angle of 45° or 135° on a predetermined condition. FIGS. 11 to 14 illustrate the first interpolation process and the second interpolation process in a case where the angle α of the inclined interpolation line La is the reference angle (45° or 135°).

The first interpolation processor 42 performs the first interpolation process, using the values of the plurality of the input pixels arranged in the horizontal direction or in the vertical direction and derives each values of the plurality of noted points on the inclined interpolation line La. The second interpolation processor 43 performs the second interpolation process, using the values of the four noted points on the inclined interpolation line La, to derive the value of the processed pixel. Moreover, in a case of an overshoot or an undershoot of the derived value of the processed pixel, the pixel value modifier 44 modifies the value of the processed pixel.

Figure 24:
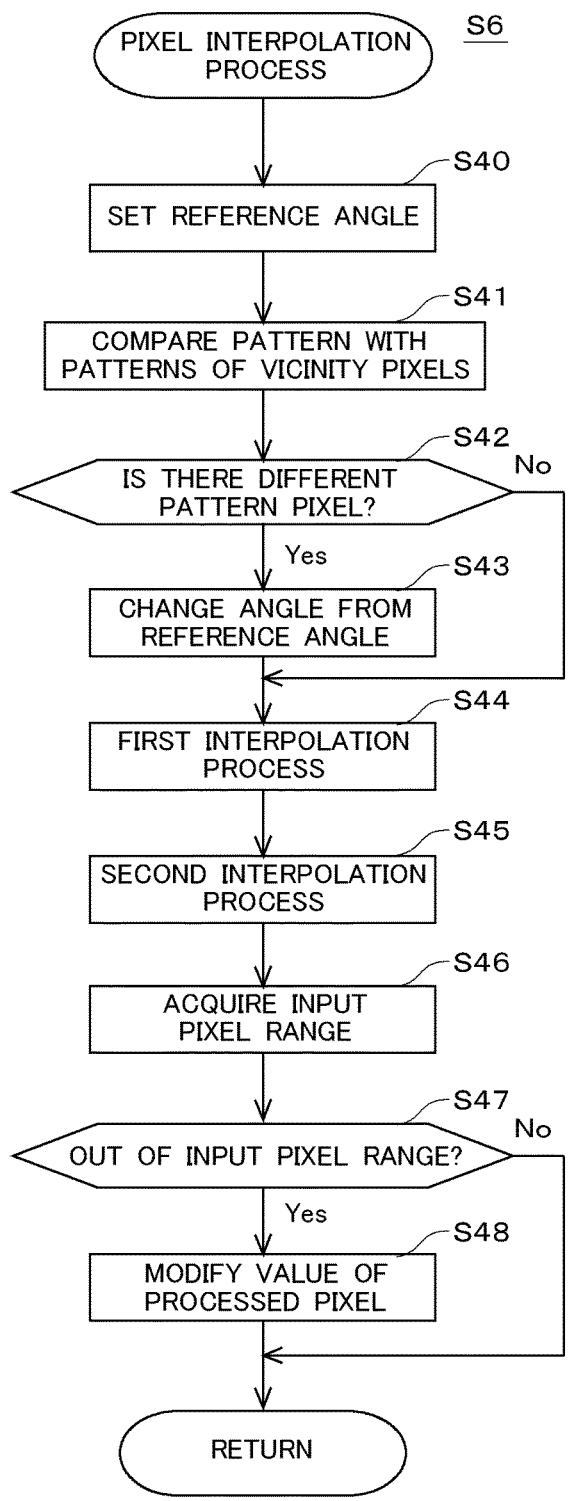
FIG. 24 illustrates a detailed flow of a pixel interpolation process.

FIG. 24 illustrates a detailed flow of the pixel interpolation process (the step S6 in FIG. 6). As described above, the pixel interpolation process is performed for all the pixels of the output image. Moreover, when the pixel interpolation process is started, the edge information (pattern etc.) of all the pixels of the output image has been communicated from the edge information derivation part 3 to the pixel interpolation part 4. The edge of the processed pixel to be processed in the pixel interpolation process is hereinafter referred to as "processed edge."

In the pixel interpolation process, the inclined angle setter 41 first sets the angle α of the inclined interpolation line La extending through the processed pixel, depending on the pattern of the processed edge of the processed pixel (steps S40 to S43). Then, the first interpolation processor 42 performs the first interpolation process, depending on the angle α of the set inclined interpolation line La (a step S44) and then the second interpolation processor 43 performs the second interpolation process to derive the value of the processed pixel (a step S45).

The inclined angle setter 41 sets the angle α of the inclined interpolation line La as an initial reference angle (the step S40).

As described above, in the case of the pattern A or the pattern B ($0°<θ<90°$), the inclined angle setter 41 sets the angle α of the inclined interpolation line La in the range of $0°<α<90°$. In the case of the pattern C or the pattern D ($90°<θ<180°$), the inclined angle setter 41 sets the angle α of the inclined interpolation line La in the range of $90°<α<180°$. Therefore, in the case of the pattern A or the pattern B ($0°<θ<90°$), the reference angle is 45°, and in the case of the pattern C or the pattern D ($90°<θ<180°$), the reference angle is 135°.

Next, the inclined angle setter 41 focuses on a plurality of pixels in the vicinity of the processed pixel of the output image (hereinafter referred to as "vicinity pixel") and compares the pattern of the processed edge of the processed pixel with the patterns of the edges at the vicinity pixels (the step S41).

Figures 25, 26:
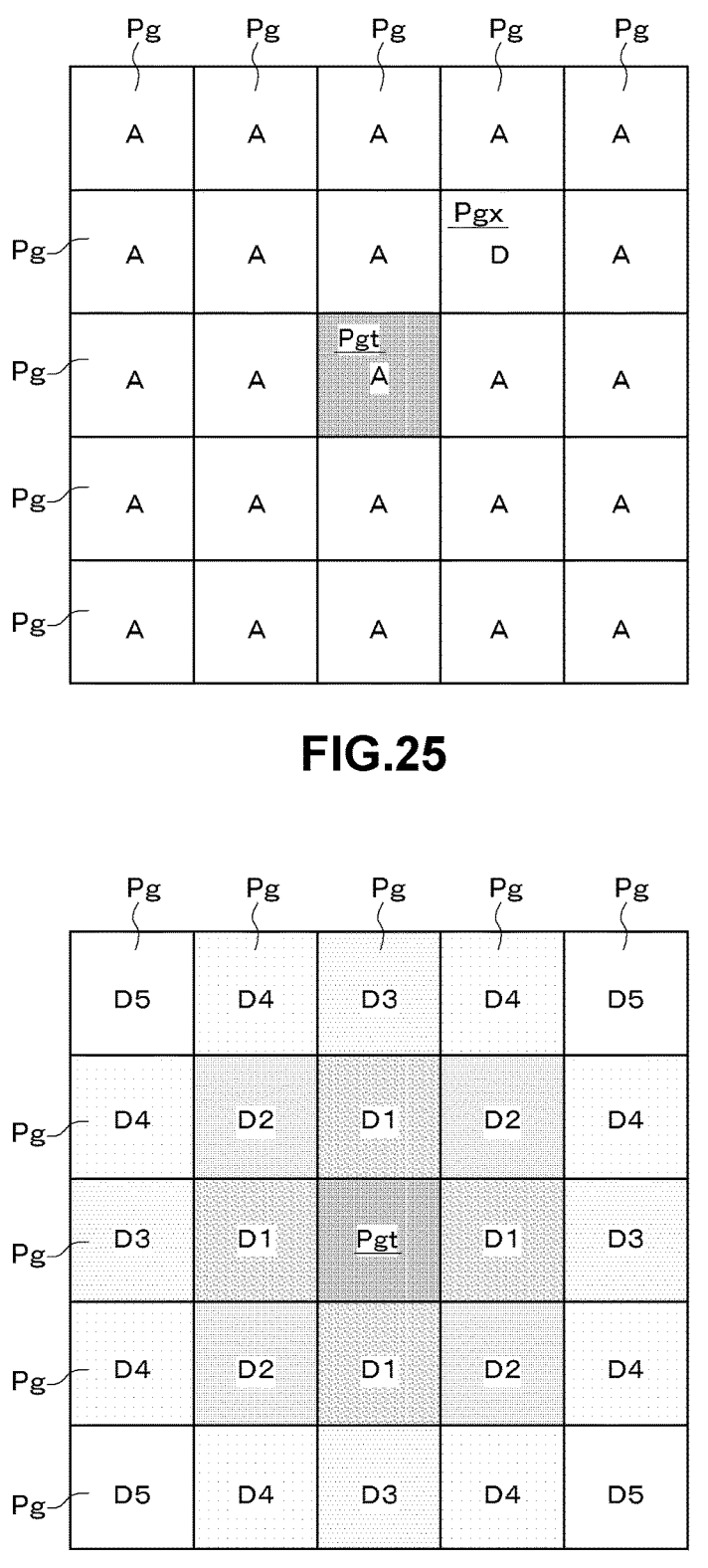

FIG. 25 illustrates the processed pixel Pgt and the plurality of vicinity pixels Pg in the vicinity of the processed pixel Pgt of the output image. As shown in FIG. 25, the inclined angle setter 41 focuses on 5×5 vicinity pixels Pg, centering on the processed pixel Pgt of the output image. Then, the inclined angle setter 41 compares the pattern of the processed edge of the processed pixel Pgt with the pattern of the edges of the vicinity pixels Pg.

FIG. 25 illustrates patterns of edges of the processed pixel Pgt and the vicinity pixels Pg in a code (A or D). In an example in FIG. 25, the processed edge of the processed pixel Pgt is the pattern A and edges at most of the vicinity pixels Pg are the pattern A, but an edge of one of the vicinity pixels Pgx is the pattern D.

Generally, the pattern of the processed edge of the processed pixel Pgt is same as the patterns of the edges of the vicinity pixels Pg. However, in a case where there is a vicinity pixel (hereinafter referred to as "different pattern pixel) Pgx at which the edge is categorized as a different pattern from the pattern of the processed edge of the processed pixel Pgt, as shown in FIG. 25, there is a high possibility of noise in the vicinity of the processed pixel Pgt. Such a noise may be amplified by the interpolation process.

Therefore, in a case where there is the different pattern pixel Pgx (Yes in the step S42 in FIG. 24), the inclined angle setter 41 changes the angle α of the inclined interpolation line La from the reference angle to prevent amplification of such a noise (a step S43). As a distance between the processed pixel Pgt and the different pattern pixel Pgx decreases, the inclined angle setter 41 increases a change amount of the angle α of the inclined interpolation line La from the reference angle.

FIG. 26 illustrates categorization of the vicinity pixels Pg based on distances from the processed pixel Pgt. The codes D1 to D5 given to the vicinity pixels Pg in FIG. 26 represent degrees of the distances from the processed pixel Pgt. The vicinity pixels Pg having the code D1 are closest to the processed pixel Pgt and the vicinity pixels Pg having the code D5 are furthest to the processed pixel Pgt. Therefore, in a case where the different pattern pixel Pgx is the vicinity pixel Pg having the code D1, the inclined angle setter 41 changes the angle α of the inclined interpolation line La from the reference angle relatively greatly. On the other hand, in a case where the different pattern pixel Pgx is the vicinity pixel Pg having the code D5, the inclined angle setter 41 changes the angle α of the inclined interpolation line La from the reference angle relatively small.

For example, the inclined angle setter 41 changes the angle α of the inclined interpolation line La from the reference angle by 30°, 25°, 20°, 15° and 10° for the vicinity pixels Pg having the code D1, the code D2, the code D3, the code D4 and the code D5, respectively. In a case of FIG. 25, since the different pattern pixel Pgx is a vicinity pixel Pg having the code D2, the inclined angle setter 41 changes, by 25°, the angle α of the inclined interpolation line La from the reference angle.

In a case where there are a plurality of different pattern pixels Pgx in the vicinity of the processed pixel Pgt, the inclined angle setter 41 changes the angle α of the inclined interpolation line La from the reference angle, based on a different pattern pixel Pgx closest to the processed pixel Pgt.

A direction in which the inclined angle setter 41 changes the angle α of the inclined interpolation line La differs, depending on a pattern of the processed edge of the processed pixel.

Figure 27:
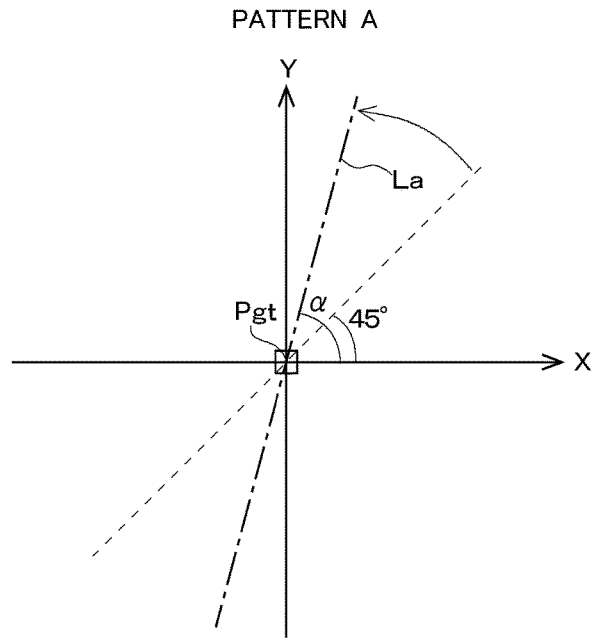
FIG. 27 illustrates an example of an angle of an inclined interpolation line in the case of the pattern A.

As shown in FIG. 27, in a case of the pattern A ($0°<θ<45°$), the inclined angle setter 41 changes the angle α of the inclined interpolation line La so as to increase the angle α from the reference angle 45°. Therefore, the inclined angle setter 41 sets the angle α of the inclined interpolation line La in a range of $45°≤α<90°$.

Figure 28:
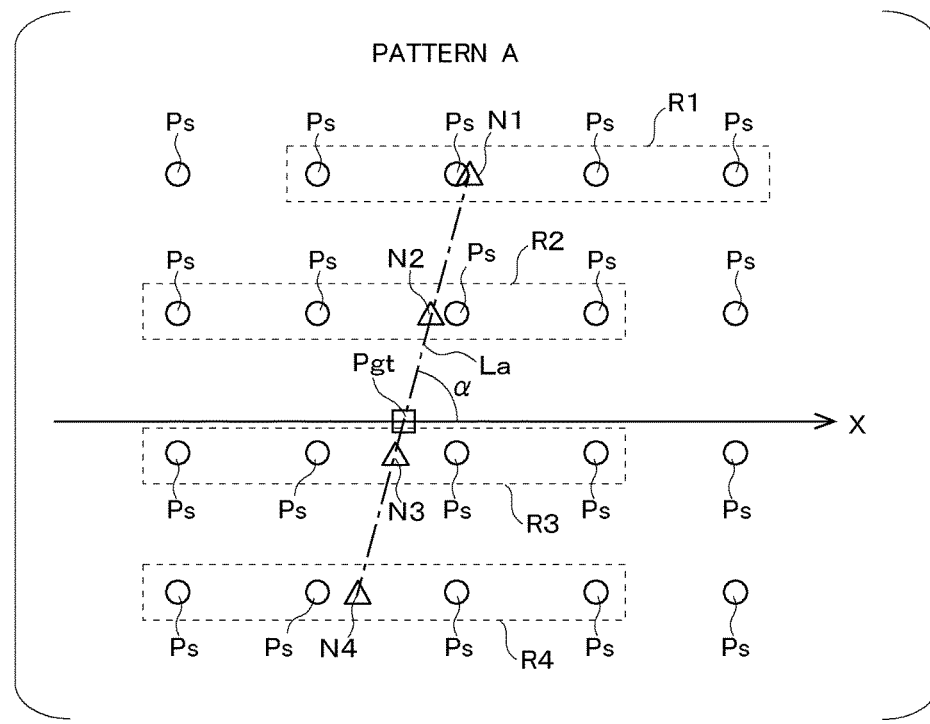
FIG. 28 illustrates processes in the case of the pattern A.

FIG. 28 illustrates the first and second interpolation processes performed after a change of the angle α of the inclined interpolation line La from the reference angle in the case of the pattern A. As shown in comparison between FIG. 11 and FIG. 28, when the angle α of the inclined interpolation line La is changed from the reference angle, the input pixels Ps closer to the processed pixel Pgt are used for the interpolation process in comparison to when the reference angle is used as the angle α of the inclined interpolation line La. Therefore, the effects (fewer jaggies and amplification of noise) produced by the interpolation process can be reduced.

Figure 29:
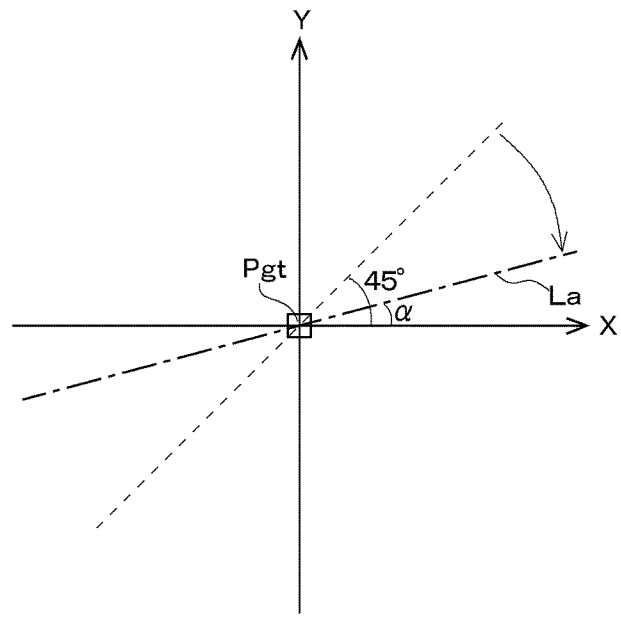
FIG. 29 illustrates an example of an angle of an inclined interpolation line in the case of the pattern B.

As shown in FIG. 29, in a case of the pattern B ($45°<θ<90°$), the inclined angle setter 41 changes the angle α of the inclined interpolation line La so as to decrease the angle α from the reference angle 45°. Therefore, the inclined angle setter 41 sets the angle α of the inclined interpolation line La in a range of $0°<α≤45°$.

Figure 30:
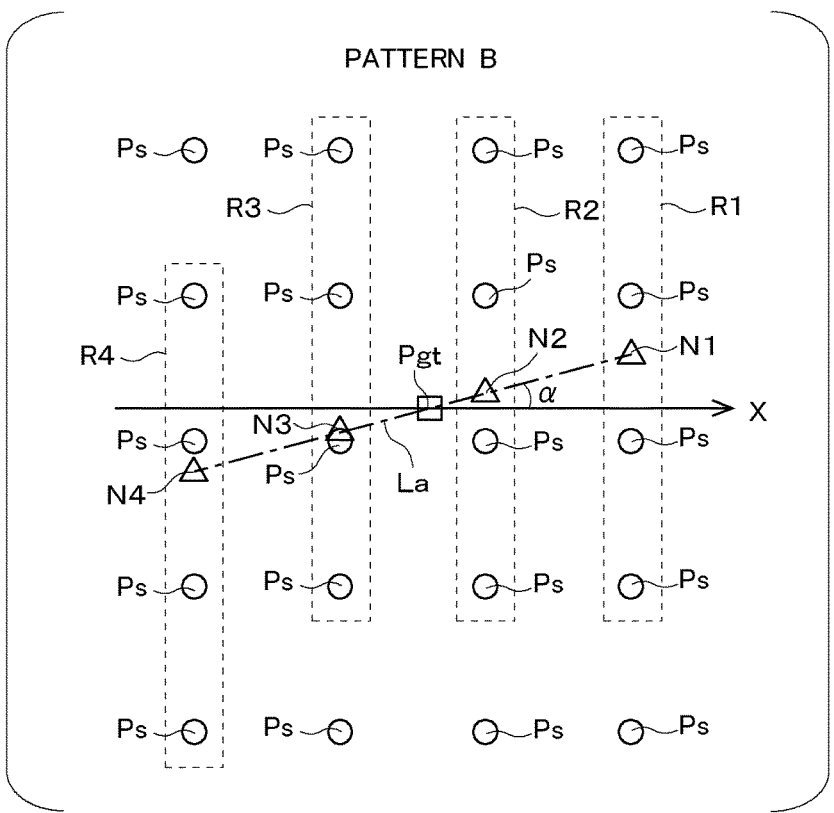
FIG. 30 illustrates processes in the case of the pattern B.

FIG. 30 illustrates the first and second interpolation processes performed after a change of the angle α of the inclined interpolation line La from the reference angle in the case of the pattern B. As shown in comparison between FIG. 12 and FIG. 30, when the angle α of the inclined interpolation line La is changed from the reference angle, the input pixels Ps closer to the processed pixel Pgt are used for the interpolation process in comparison to when the reference angle is used as the angle α of the inclined interpolation line La. Therefore, the effects (fewer jaggies and amplification of noise) produced by the interpolation process can be reduced.

Figure 31:
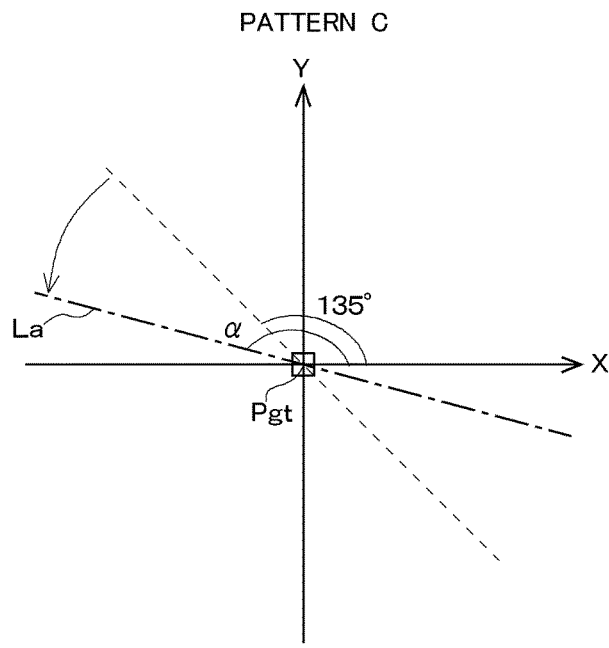
FIG. 31 illustrates an example of an angle of an inclined interpolation line in the case of the pattern C.

As shown in FIG. 31, in a case of the pattern C ($90°<\theta<135°$), the inclined angle setter 41 changes the angle α of the inclined interpolation line La so as to increase the angle α from the reference angle 135°. Therefore, the inclined angle setter 41 sets the angle α of the inclined interpolation line La in a range of $135°\leq\alpha<180°$.

Figure 32:
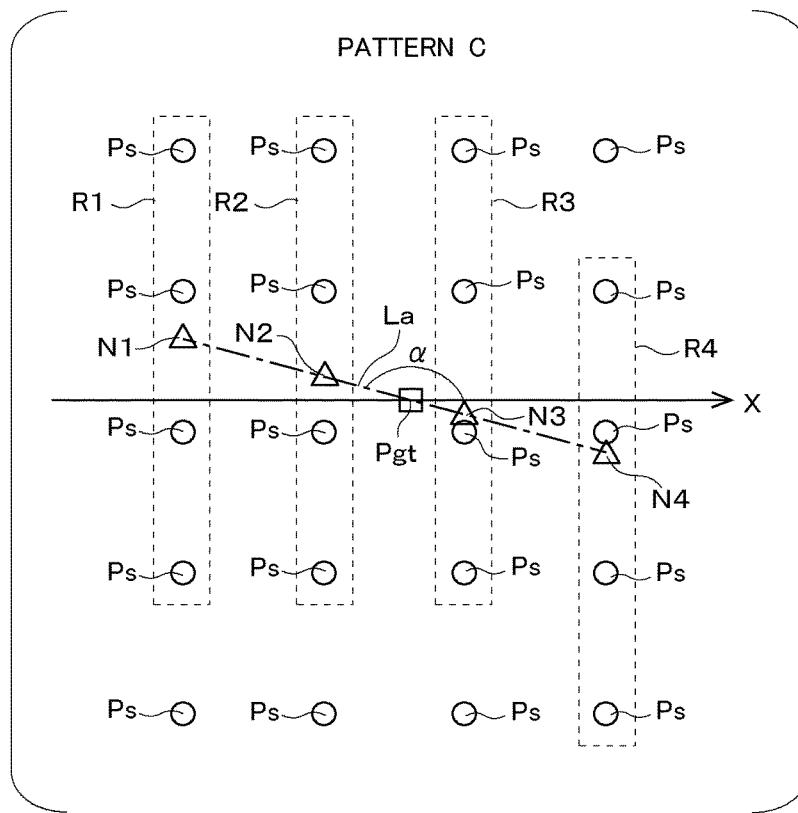
FIG. 32 illustrates processes in the case of the pattern C.

FIG. 32 illustrates the first and second interpolation processes performed after a change of the angle α of the inclined interpolation line La from the reference angle in the case of the pattern C. As shown in comparison between FIG. 13 and FIG. 32, when the angle α of the inclined interpolation line La is changed from the reference angle, the input pixels Ps closer to the processed pixel Pgt are used for the interpolation process in comparison to when the reference angle is used as the angle α of the inclined interpolation line La. Therefore, the effects (fewer jaggies and amplification of noise) produced by the interpolation process can be reduced.

Figure 33:
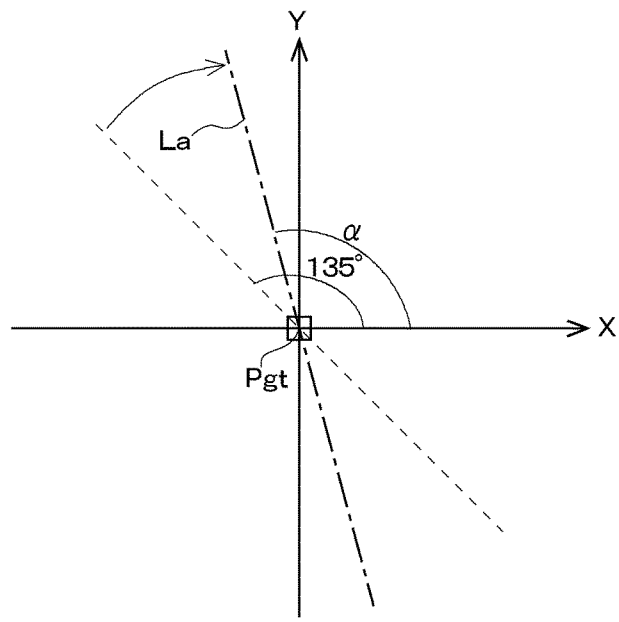
FIG. 33 illustrates an example of an angle of an inclined interpolation line in the case of the pattern D.

As shown in FIG. 33, in a case of the pattern D ($135°<\theta<180°$), the inclined angle setter 41 changes the angle α of the inclined interpolation line La so as to decrease the angle α from the reference angle 135°. Therefore, the inclined angle setter 41 sets the angle α of the inclined interpolation line La in a range of $90°<\alpha\leq135°$.

Figure 34:
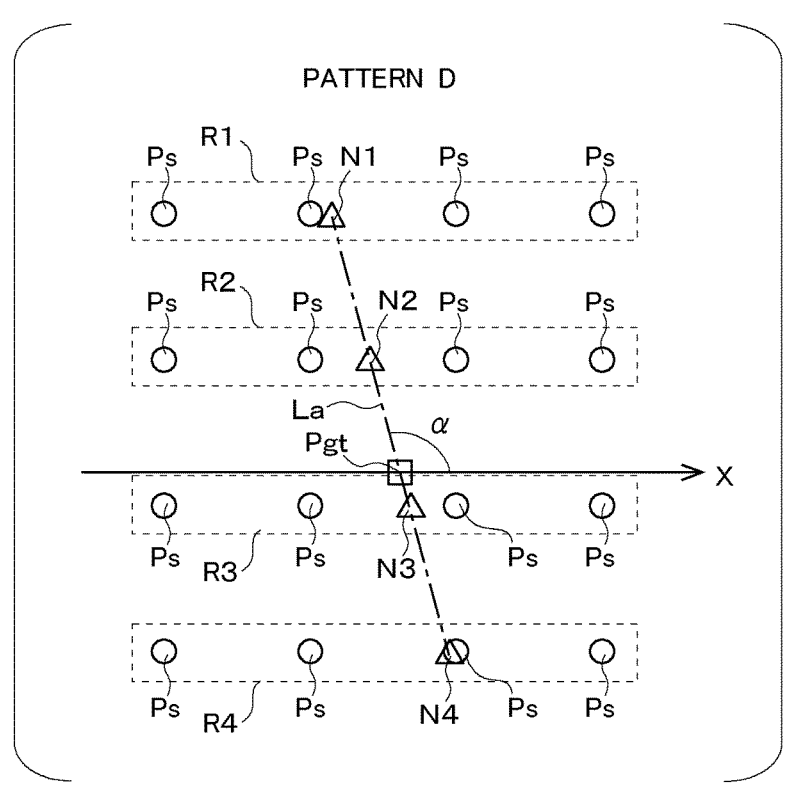
FIG. 34 illustrates processes in the case of the pattern D.

FIG. 34 illustrates the first and second interpolation processes performed after a change of the angle α of the inclined interpolation line La from the reference angle in the case of the pattern D. As shown in comparison between FIG. 14 and FIG. 34, when the angle α of the inclined interpolation line La is changed from the reference angle, the input pixels Ps closer to the processed pixel Pgt are used for the interpolation process in comparison to when the reference angle is used as the angle α of the inclined interpolation line La. Therefore, the effects (fewer jaggies and amplification of noise) produced by the interpolation process can be reduced.

Once the value of the processed pixel is derived in the first interpolation and the second interpolation (the steps S44 and S45), in the case of an overshoot or an undershoot of the derived value of the processed pixel, the pixel value modifier 44 modifies the value of the processed pixel (steps S46 to S48).

Figure 35:
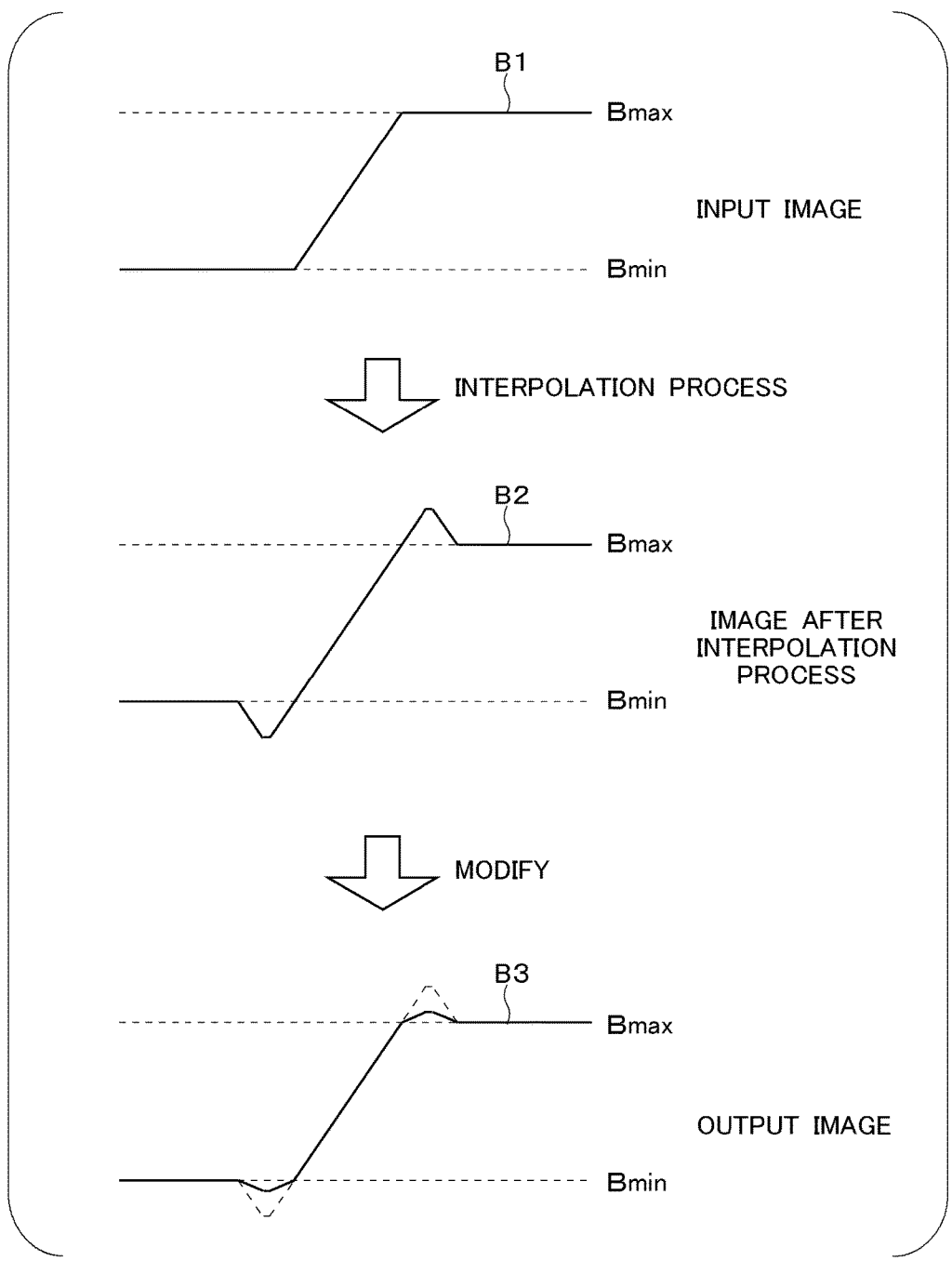
FIG. 35 illustrates an overshoot and an undershoot.

As described above, an arithmetic expression for bicubic interpolation is used for both of the first interpolation process and the second interpolation process. Therefore, as shown in FIG. 35, a rapid change of a pixel value B1 of the input image, on which the interpolation process has been performed, may cause a phenomenon (overshoot or undershoot) in which a pixel value B2 of an image after the interpolation process is out of a range from a minimum value Bmin to a maximum value Bmax of the pixel value B1 of the input image. In a case where the image having the phenomenon after the interpolation process is used as an output image without modification, there is a possibility that the user may feel strange about the output image. Therefore, when the phenomenon appears, the pixel value modifier 44 modifies the pixel value B2, as shown in a lower portion in FIG. 35, such that the pixel value B2 is closer to the range (from Bmin to Bmax) of the pixel value B1 of the input image and uses the modified result as a pixel value B3 of a pixel of the output image.

The pixel value modifier 44 first acquires a range (hereinafter referred to as "input pixel range") of values of pixels of the input image on which the interpolation process has been performed (the step S46). The pixel value modifier 44 selects four input pixels Ps from amongst the 16 input pixels Ps used for the first interpolation, to derive the input pixel range.

Figure 36:
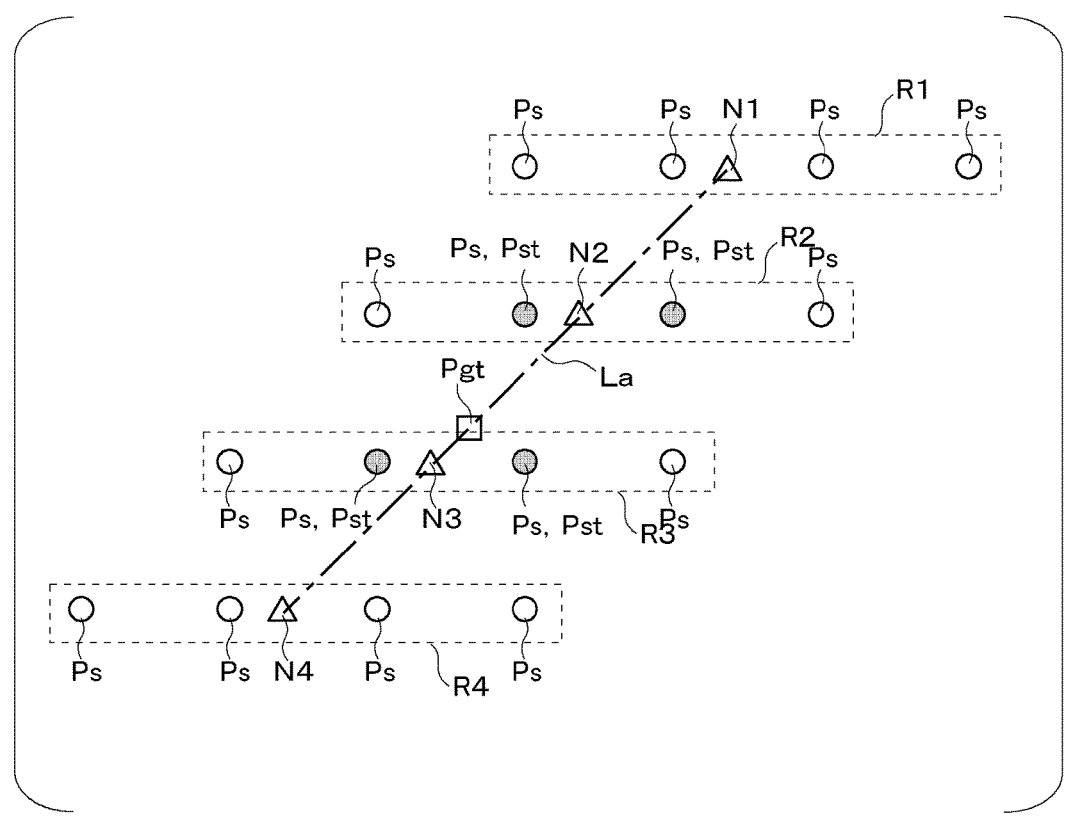
FIG. 36 illustrates input pixels to derive an input pixel range.

The pixel value modifier 44, as shown in FIG. 36, selects four input pixels Pst that are adjacent to the inclined interpolation line La and that are the closest to the processed pixel Pgt. In other words, the pixel value modifier 44 selects the four input pixels Pst in a center from amongst the 16 input pixels Ps used for the first interpolation process. Then, the pixel value modifier 44 acquires the maximum value Bmax and the minimum value Bmin of the selected four input pixels Pst and acquires a range from the minimum value Bmin to the maximum value Bmax as the input pixel range.

Next, the pixel value modifier 44 determines whether or not the value of the processed pixel derived in the interpolation process is out of the input pixel range (the step S47). In a case where the value of the processed pixel is out of the input pixel range, the pixel value modifier 44 modifies the value of the processed pixel so as to be closer to the input pixel range (the step S48).

In a case of an overshoot, the pixel value modifier 44 modifies a value Bg of the processed pixel by an expression (8) below. In a case of undershoot, the pixel value modifier 44 modifies the value Bg of the processed pixel by an expression (9) below. In those expressions (8) and (9), Bg is a value of the processed pixel and N is coefficient ($0<N<1$).

$$Bg=Bg-(Bg-Bmax)\cdot N \qquad (8)$$

$$Bg=Bg+(Bmin-Bg)\cdot N \qquad (9)$$

As described above, since the value of the processed pixel is modified based on the input pixel range defined by the maximum value Bmax and the minimum value Bmin of the four input pixels Pst in consideration of the inclined interpolation line La, the overshoot and the undershoot generated in the interpolation process using the inclined interpolation line La can be properly modified.

Figure 37:
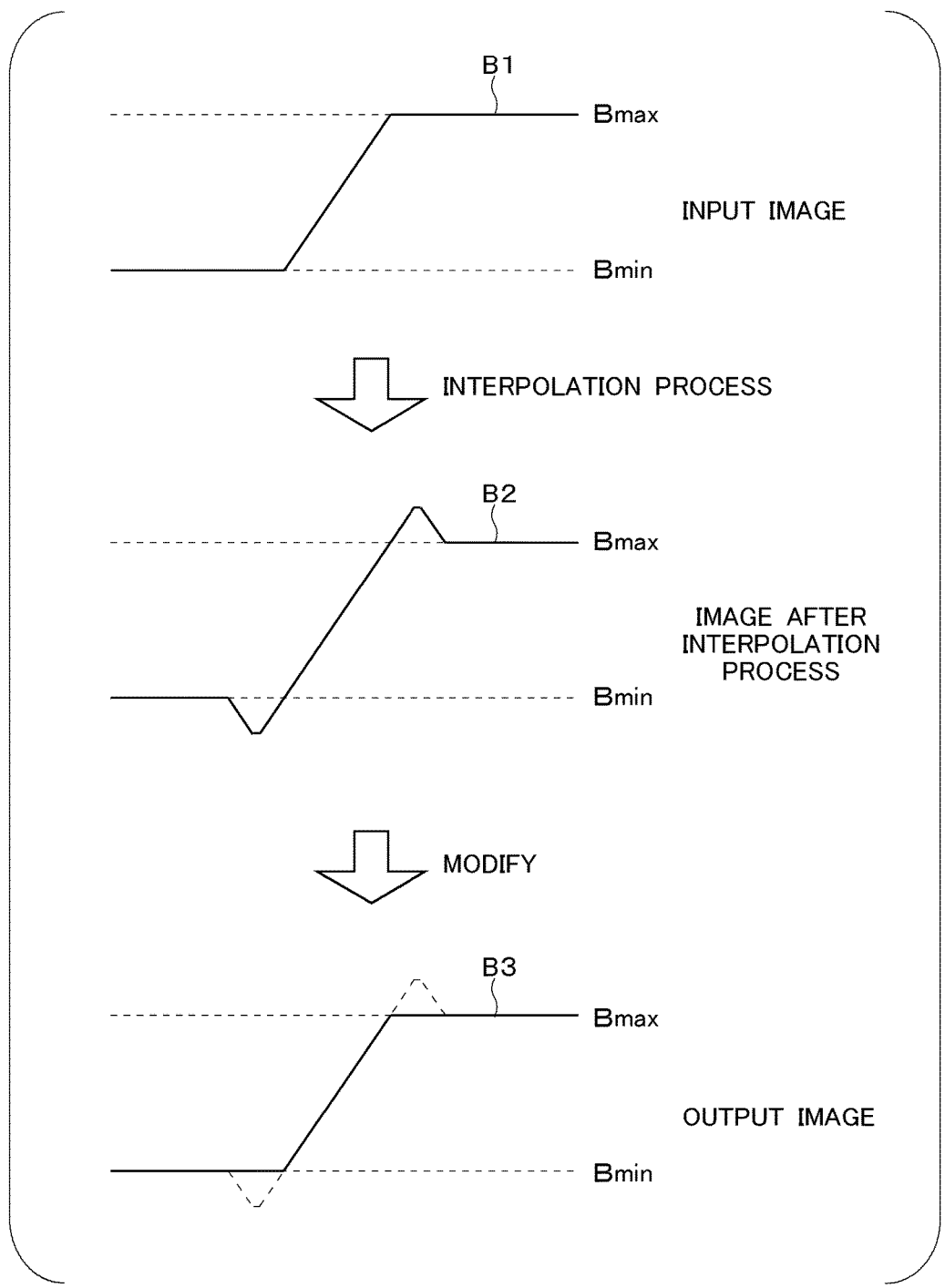
FIG. 37 illustrates an overshoot and an undershoot.

In this embodiment, the pixel value modifier 44 modifies the value of the processed pixel so as to be closer to the input pixel range. However, as shown in FIG. 37, the value of the processed pixel may be limited to a value in the input pixel range. In this case, the coefficient N in the expressions (8) and (9) is 1.

<5. Modifications>

The embodiment of the invention is described above. However, the invention is not limited to the embodiment and various modifications are possible. Such modifications are described below. Any of all forms in the foregoing embodiment and modifications below may be combined arbitrarily with one another.

Figure 38:
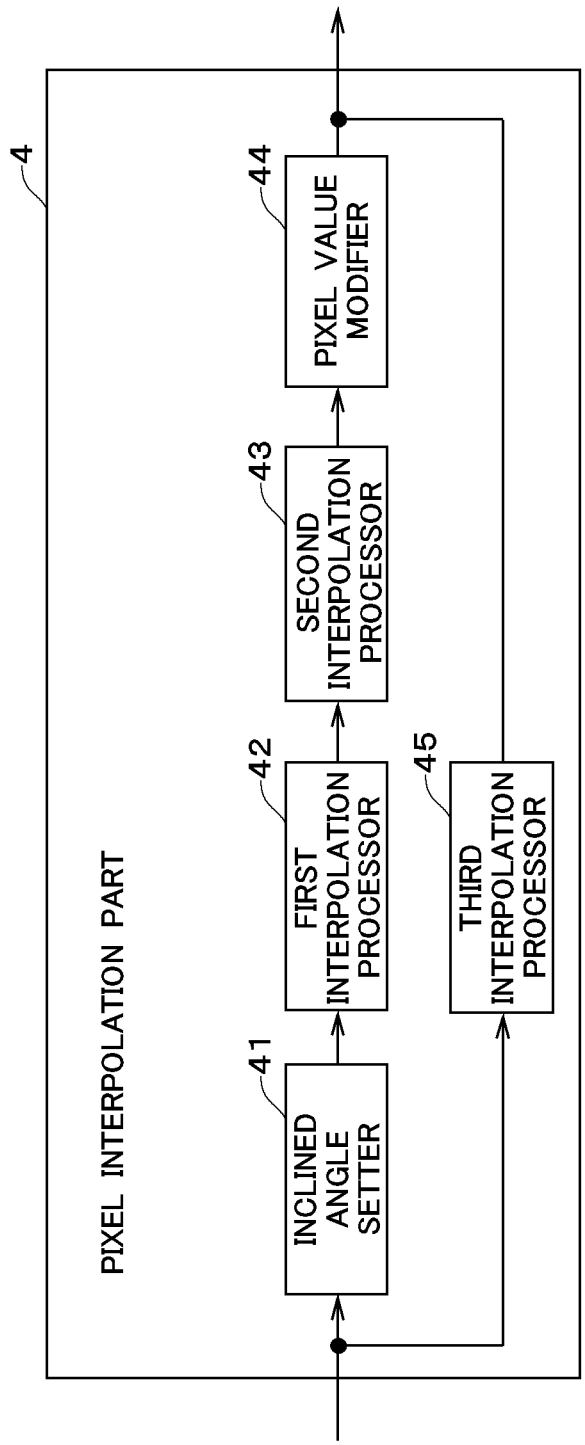
FIG. 38 illustrates an example of another configuration of a pixel interpolation part.

In the foregoing embodiment, in the step S23 of the edge information derivation process (refer to FIG. 17), in the case where the self-location edge extends substantially in the horizontal direction or in the vertical direction, the strength Se of the self-location edge is reduced. However, in the case where the self-location edge extends substantially in the horizontal direction or in the vertical direction, instead of the inclination interpolation (the first and second interpolation processes), a value of a processed pixel may be derived by an interpolation process using a conventional interpolation, such as bilinear interpolation in the horizontal direction and the vertical direction. In this case, as shown in FIG. 38, a pixel interpolation part 4 includes a third interpolation processor 45 that performs an interpolation process, using a conventional interpolation method. In the case where the self-location edge extends substantially in the horizontal direction or in the vertical direction, a jaggy hardly occur in a location of the processed pixel. Therefore, it is possible to prevent generation of noises caused by the first interpolation and the second interpolation.

In the foregoing embodiment, in the step S31 of the edge information derivation process (refer to FIG. 17), an edge having a greatest strength is selected, as the processed edge, from the plurality of vicinity edges and the self-location edge. However, a processed edge may be derived by weighting and weighted average of the plurality of vicinity edges and a self-location edge based on distances thereof from a location of a processed pixel.

Moreover, an arbitrary vicinity edge may be selected as a reference vicinity edge for derivation of the processed edge in the step S31 of the edge information derivation process.

Moreover, in the foregoing embodiment, an arithmetic expression same as an arithmetic expression for bicubic interpolation is used for the first interpolation and the second interpolation processes. However, another well-known arithmetic expression, such as bilinear interpolation and Lanczos3, may be used. Number of the input pixels Ps that are used for the interpolation process may be changed, depending on an arithmetic expression to be used.

Moreover, in the pixel interpolation process in the foregoing embodiment, in the case where there is the different pattern pixel Pgx, the inclined angle setter 41 changes the angle α of the inclined interpolation line La from the reference angle. Instead or in addition, an inclined angle setter 41 may change an angle α of an inclined interpolation line La relative to a horizontal direction from a reference angle, depending on a strength of a processed edge. In a case where an interpolation process that produces a great effect is performed to a processed edge having a relatively small strength, noises may be amplified. Therefore, it is recommended that a change amount of the angle α of the inclined interpolation line La from the reference angle should be increased as a strength of a processed edge decreases. Thus, the effect produced by the interpolation process (fewer jaggies and amplification of noises) can be adjusted, depending on the strength of the processed edge.

Moreover, constants and coefficients may be changed arbitrarily.

In the foregoing embodiment, all or a part of the functions of the size changer 2 as a function implemented by a hardware circuit may be implemented by software. For example, same functions as the functions of the size changer 2 may be implemented by an arithmetic process by CPU of the controller 10 in accordance with a program.

Moreover, in the foregoing embodiment, the image processing apparatus 1 is a vehicle-mounted apparatus. However, a general-purpose computer, such as a personal computer and a tablet PC, may function as an image processing apparatus having substantially same functions when a program is executed on the computer.

While the invention has been shown and described in detail, the foregoing description is in all aspects illustrative and not restrictive. It is therefore understood that numerous other modifications and variations can be devised without departing from the scope of the invention.

What is claimed is:

1. An image processing apparatus that generates an output image from an input image by changing a size of the input image, the image processing apparatus comprising:
   a first interpolation processor that derives values of a plurality of noted points on an inclined interpolation line by performing a first interpolation process, the first interpolation process using values of a plurality of input pixels of the input image aligned in an arranged direction that is one of a horizontal direction and a vertical direction to derive the value for each of the noted points, the inclined interpolation line extending through a location of a processed pixel of the output image and being inclined relative to the horizontal direction; and
   a second interpolation processor that derives a value of the processed pixel by performing a second interpolation process, using the derived values of the plurality of noted points on the inclined interpolation line.

2. The image processing apparatus according to claim 1, further comprising:
   an edge processor that derives information of a processed edge of the processed pixel of the output image.

3. The image processing apparatus according to claim 2, wherein
   the first interpolation processor performs the first interpolation process, according to an angle of the processed edge relative to the horizontal direction.

4. The image processing apparatus according to claim 3, wherein
   the first interpolation processor selects the arranged direction of the plurality of input pixels from the horizontal direction and the vertical direction, according to the angle of the processed edge relative to the horizontal direction, the arranged direction being used for the first interpolation process.

5. The image processing apparatus according to claim 4, wherein
   in a case where an angle θ is the angle of the processed edge relative to the horizontal direction:
   where 45°<θ<135°, the first interpolation processor determines that the arranged direction of the plurality of input pixels is the vertical direction, the arranged direction being used for the first interpolation process; and
   where 0°<θ<45° or 135°<θ<180°, the first interpolation processor determines that the arranged direction of the plurality of input pixels is the horizontal direction.

6. The image processing apparatus according to claim 2, wherein
   the edge processor derives the information of the processed edge based on a plurality of vicinity edges at a plurality of vicinity locations in a vicinity of the processed pixel and based on a self-location edge at a location of the processed pixel.

7. The image processing apparatus according to claim 6, wherein
   each of the plurality of vicinity locations is a center of four input pixels that form a smallest rectangle.

8. The image processing apparatus according to claim 6, wherein
   the edge processor selects, as the processed edge, one edge having a greatest strength from amongst the plurality of vicinity edges and the self-location edge.

9. The image processing apparatus according to claim 8, wherein the edge processor, in a case where any of the plurality of vicinity edges extends substantially in the horizontal direction or the vertical direction, reduces a strength of the vicinity edge.

10. The image processing apparatus according to claim 8, wherein
the edge processor that reduces a strength of each of the plurality of vicinity edges at the plurality of vicinity locations, according to a distance of each of the plurality of vicinity locations from the location of the processed pixel.

11. The image processing apparatus according to claim 8, wherein
the edge processor that reduces a strength of the self-location edge in a case where the self-location edge extends substantially in the horizontal direction or in the vertical direction.

12. The image processing apparatus according to claim 6, further comprising:
a third interpolation processor that performs a third interpolation process in the horizontal direction or in the vertical direction and derives the value of the processed pixel, instead of the first interpolation processor and the second interpolation processor in a case where the self-location edge extends substantially in the horizontal direction or in the vertical direction.

13. The image processing apparatus according to claim 2, further comprising:
an angle setter that sets an angle of the inclined interpolation line relative to the horizontal direction, according to an angle of the processed edge relative to the horizontal edge.

14. The image processing apparatus according to claim 13, wherein
in a case where an angle $\theta$ is the angle of the processed edge relative to the horizontal direction and where an angle $\alpha$ is the angle of the inclined interpolation line relative to the horizontal direction, the angle setter sets:
where $0°<\theta<90°$, $0°<\alpha<90°$; and
where $90°<\theta<180°$, $90°<\alpha<180°$.

15. The image processing apparatus according to claim 13, wherein
the edge processor derives an angle of an edge of each pixel of the output image relative to the horizontal direction and categorizes the edge of each pixel as one of a plurality of patterns based on the derived angle of the edge, and
in a case where there is a different pattern pixel, an edge of which is categorized as a pattern different from a pattern of the processed edge of the processed pixel, in a vicinity of the processed pixel of the output image, the angle setter changes the angle of the inclined interpolation line relative to the horizontal direction from a reference angle.

16. The image processing apparatus according to claim 15, wherein
in a case where an angle $\theta$ is the angle of the processed edge relative to the horizontal direction, the reference angle is
where $0°<\theta<90°$, 45° and
where $90°<\theta<180°$, 135°.

17. The image processing apparatus according to claim 16, wherein
in a case where an angle $\alpha$ is the angle of the inclined interpolation line relative to the horizontal direction, the angle setter sets the angle $\alpha$:
where $0°<\theta<45°$, $45°\leq\alpha<90°$;
where $45°<\theta<90°$, $0°<\alpha\leq45°$;
where $90°<\theta<135°$, $135°\leq\alpha<180°$; and
where $135°<\theta<180°$, $90°<\alpha\leq135°$.

18. The image processing apparatus according to claim 15, wherein
as a distance between the processed pixel and the different pattern pixel decreases, the angle setter increases a change amount of the angle of the inclined interpolation line from the reference angle.

19. The image processing apparatus according to claim 13, wherein
the angle setter changes the angle of the inclined interpolation line relative to the horizontal direction, from a reference angle, according to a strength of the processed edge, and increases a change amount of the angle of the inclined interpolation line from the reference angle as the strength of the processed edge decreases.

20. The image processing apparatus according to claim 13, further comprising:
a modifier that selects four input pixels that are adjacent to the inclined interpolation line and also are the closest to the processed pixel, from amongst the plurality of input pixels used by the first interpolation processor, and modifies the value of the processed pixel in a case where the value of the processed pixel derived by the second interpolation processor is out of a range defined by a maximum value and a minimum value of the four input pixels.

21. An image processing method for generating an output image from an input image by changing a size of the input image, the image processing method comprising the steps of:
(a) deriving values of a plurality of noted points on an inclined interpolation line by performing a first interpolation process, the first interpolation process using values of a plurality of input pixels of the input image aligned in an arranged direction that is one of a horizontal direction and a vertical direction to derive the value for each of the noted points, the inclined interpolation line extending through a location of a processed pixel of the output image and being inclined relative to the horizontal direction; and
(b) deriving a value of the processed pixel by performing a second interpolation process, using the derived values of the plurality of noted points on the inclined interpolation line.

22. A non-transitory computer-readable recording medium that stores a program to be executed by a computer for generating an output image from an input image by changing a size of the input image, the program causing the computer to execute the steps of:
(a) deriving values of a plurality of noted points on an inclined interpolation line by performing a first interpolation process, the first interpolation process using values of a plurality of input pixels of the input image aligned in an arranged direction that is one of a horizontal direction and a vertical direction to derive the value for each of the noted points, the inclined interpolation line extending through a location of a processed pixel of the output image and being inclined relative to the horizontal direction; and
(b) deriving a value of the processed pixel by performing a second interpolation process, using the derived values of the plurality of noted points on the inclined interpolation line.

* * * * *